United States Patent [19]

Broemer et al.

[11] 4,040,846
[45] Aug. 9, 1977

[54] OPTICAL FLUOROPHOSPHATE GLASS AND PROCESS OF MAKING SAME

[75] Inventors: Heinz Broemer, Hermannstein; Norbert Meinert, Bielhausen, both of Germany

[73] Assignee: Ernst Leitz G.m.b.H., Wetzlar, Germany

[21] Appl. No.: 667,836

[22] Filed: Mar. 17, 1976

[30] Foreign Application Priority Data

Mar. 29, 1975 Germany .............................. 2514017

[51] Int. Cl.² .......................... C03C 3/16; C03C 3/18
[52] U.S. Cl. ................................................. 106/47 Q
[58] Field of Search .............. 106/47 Q, 47 R; 65/134

[56] References Cited

U.S. PATENT DOCUMENTS

| | | | |
|---|---|---|---|
| 2,901,363 | 8/1959 | Pincus | 106/47 Q |
| 2,919,201 | 12/1959 | Izunitani | 106/47 Q |
| 2,996,391 | 8/1961 | Weissenberg | 106/47 Q |
| 3,068,108 | 12/1962 | Giffchen | 106/47 Q |
| 3,492,136 | 1/1970 | Bromer | 106/47 Q |
| 3,508,937 | 4/1970 | Bromer | 106/47 Q |
| 3,597,245 | 8/1971 | Bromer | 106/47 Q |
| 3,656,976 | 4/1972 | Izunitani | 106/47 Q |
| 3,671,276 | 6/1972 | Bromer | 106/47 Q |
| 3,847,624 | 11/1974 | Broemer | 106/47 Q |
| 3,954,484 | 5/1976 | Broemer et al. | 106/47 Q |

*Primary Examiner*—Winston A. Douglas
*Assistant Examiner*—Mark Bell
*Attorney, Agent, or Firm*—Erich M. H. Radde

[57] ABSTRACT

A fluorophosphate glass of a high positive anomalous partial dispersion $\Delta\nu_e$ within the range of from about +10.0 to about +21.0, a relatively high index of refraction $n_e$ within the range of from about 1.47 to about 1.54, and an Abbe number $\nu_e$ within the range of from about 84.1 to about 51.0 is provided. A simple process of melting such a glass is disclosed.

24 Claims, 2 Drawing Figures

OPTICAL FLUOROPHOSPHATE GLASS AND PROCESS OF MAKING SAME

BACKGROUND OF THE INVENTION

1. Field of the Invention

The present invention relates to a process of producing a fluorophosphate glass and more particularly to a process of producing a fluorophosphate glass having a high positive anomalous partial dispersion $+ \Delta\nu_e$ and relatively high indices of refraction $n_e$ with Abbe numbers $\nu_e$ between 84.1 and 51.0 and to such an optical fluorophosphate glass.

2. Description of the Prior Art

Heretofore crystals — such as, for instance, crystals of calcium fluoride, i.e. of fluorite ($CaF_2$) — namely crystals having an extremely highly positive anomalous partial dispersion value, were required in micro-optical as well as macro-optical apochromatic systems in which the so-called "secondary spectrum" was corrected. The three optical parameters for the mineral fluorite which are of interest in this connection are as follows:

| Index of refraction | $n_e$ | = | 1.4349 |
|---|---|---|---|
| Abbe-value | $\nu_e$ | = | 94.8 |
| Partial dispersion | $\Delta\nu_e$ | = | +31.5 |

However, the use of said natural or synthetic mineral in optical systems is accompanied by considerable difficulties in the manufacturing process because the properties of said material are rather unsatisfactory. For instance, cubic fluorite has a pronounced ability of being split along its (111)-direction. Furthermore, it has a low hardness, namely a hardness of 4 according to the Mohs' hardness scale. Said low hardness results in an early destruction of its surface areas. Finally its enormously high price prohibits its use in many modern optical systems.

Therefore, attempts have been made to produce, by melting, optical glasses with similar optical parameters and to utilize such glasses technologically in the manufacture of highly valuable, completely corrected objectives.

For producing such known glasses there are used as glass-forming agents preferably phosphates of the I., II., and/or III. Group of the Periodic System of chemical elements. For instance, German Pat. No. 1,596,877 describes a fluorophosphate glass which contains 9 mol % to 12 mol % of metaphosphates of the monovalent elements lithium and/or sodium and/or potassium as well as of the bivalent alkaline earth metal element magnesium and of the trivalent element aluminum. In such glasses the proportion of aluminum metaphosphate must at least amount to half of the entire phosphate amount.

Furthermore, glasses in which beryllium fluoride ($BeF_2$) is used as glass-forming component, are known. These glasses, however, have not achieved any technological importance due to their very high toxicity and the inherent perils encountered during the melting process when using such glass-forming components. Furthermore, these beryllium fluoride-containing phosphate glasses have the tendency to devitrify very considerably, especially when larger melt charges are molten.

The known glasses have the great disadvantage that they show relatively numerous inhomogeneities which are due to the technology employed during melting on account of the inherent chemical composition of the melt.

SUMMARY OF THE INVENTION

It is one object of the present invention to provide optical fluorophosphate glasses of a high positive anomalous partial dispersion and of relatively high indices of refraction with Abbe numbers $\nu_e$ between 84.1 and 51.0 which glasses do not have the disadvantages of the known glasses.

Another object of the present invention is to provide a process for producing such optical glasses which process, due to the composition of the molten mixture of components according to the present invention, permits to stir the melt on cooling even down to relatively high viscosity values.

Other objects of the present invention and advantageous features thereof will become apparent as the description proceeds.

In principle these objects are achieved in accordance with the present invention by providing a fluorophosphate glass of the following composition, given in percent by weight:

COMPONENT (a):

9% to 20% of phosphorus pentoxide ($P_2O_5$),
0% to 4% of cadmium oxide (CdO),
0% to 15% of lead monoxide (PbO),
0% to 14% of antimony trioxide ($Sb_2O_3$),
0% to 10% of lanthanum oxide ($La_2O_3$),
0% to 3% of germanium dioxide ($GeO_2$),
0% to 6% of titanium dioxide ($TiO_2$),
0% to 7% of niobium pentoxide ($Nb_2O_5$),
0% to 7% of molybdenum trioxide ($MoO_3$),
0% to 9% of tungsten trioxide ($WO_3$);

COMPONENT (b):

3% to 7% of magnesium fluoride ($MgF_2$),
5% to 19% of calcium fluoride ($CaF_2$),
0% to 11% of strontium fluoride ($SrF_2$),
0% to 34% of barium fluoride ($BaF_2$),
0% to 4% of cadmium fluoride ($CdF_2$),
21% to 23% of aluminum fluoride ($AlF_3$),
0% to 10% of bismuth trifluoride ($BiF_3$); and, if desired,

COMPONENT (c):

0% to 6% of potassium hydrogen fluoride ($KHF_2$),
0% to 15% of potassium titanium hexafluoride ($K_2TiF_6$),
0% to 24% of barium titanium hexafluoride ($BaTiF_6$).

The calculated phosphorus content of such a glass is between about 4.1% and about 8.4%, by weight, its fluorine content is between about 30.8% and about 37.6%, by weight, and the ratio of fluorine to phosphorus (F/P) is between about 3.7 and about 8.2

A preferred and highly advantageous fluorophosphate glass A according to the present invention has the following composition in weight percent:

COMPONENT (a):

12% to 20% of phosphorus pentoxide ($P_2O_5$),
8% to 14% of antimony trioxide ($Sb_2O_3$),

COMPONENT (b):

3% to 7% of magnesium fluoride ($MgF_2$),
17% to 19% of calcium fluoride ($CaF_2$), 10% to 11% of strontium fluoride (SrF$_2$),
15% to 23% of barium fluoride (BaF$_2$),
21% to 23% of aluminum fluoride (AlF$_3$), COMPONENT (c):

0% to 6% of potassium hydrogen fluoride (KHF$_2$).

In the resulting glass the calculated phosphorus content amounts to between 5.3% and 8.4%, by weight, and the calculated fluorine content to between 31.4% and 35.7%, by weight, while the ratio of fluorine to phosphorus (F/P) is between 3.7 and 6.7.

Another valuable glass B is composed, in weight percent, as follows:

COMPONENT (a):

9% to 18% of phosphorus pentoxide (P$_2$O$_5$),
0% to 15% of lead monoxide (PbO),
0% to 10% of antimony trioxide (Sb$_2$O$_3$),
0% to 7% of niobium pentoxide (Nb$_2$O$_5$);

COMPONENT (b):

5% to 6% of magnesium fluoride (MgF$_2$),
17% to 18% of calcium fluoride (CaF$_2$),
8% to 9% of strontium fluoride (SrF$_2$),
23% to 24% of barium fluoride (BaF$_2$),
21% to 22% of aluminum fluoride (AlF$_3$).

In the resulting glass the calculated phosphorus content amounts to between 4.1% and 7.8%, by weight, and the calculated fluorine content amounts to 33.8%, by weight, while the ratio of fluorine to phosphorus (F/P) is between 4.3 and 8.2.

Still another valuable glass C according to the present invention is composed, in weight percent, as follows:

COMPONENT (a):

13% to 15% of phosphorus pentoxide (P$_2$O$_5$),
0% to 4% of cadmium oxide (CdO),
1% to 10% of antimony trioxide (Sb$_2$O$_3$),
0% to 10% of lanthanum oxide (La$_2$O$_3$);

COMPONENT (b):

5% to 6% of magnesium fluoride (MgF$_2$),
17% to 18% of calcium fluoride (CaF$_2$),
8% to 9% of strontium fluoride (SrF$_2$),
23% to 24% of barium fluoride (BaF$_2$),
21% to 22% of aluminum fluoride (AlF$_3$).

Its calculated phosphorus content amounts to between 6.0% and 6.3%, by weight, and the calculated fluorine content to 33.8%, by weight, while the ratio of fluorine to phosphorus (F/P) is between 5.4 and 5.6.

Another glass D according to the present invention has the following composition, in weight percent:

COMPONENT (a):

12% to 19% of phosphorus pentoxide (P$_2$O$_5$),
0% to 7% of antimony trioxide (Sb$_2$O$_3$),
0% to 6% of lanthanum oxide (La$_2$O$_3$),
0% to 6% of titanium dioxide (TiO$_2$), COMPONENT (b):

5% to 6% of magnesium fluoride (MgF$_2$),
17% to 18% of calcium fluoride (CaF$_2$),
8% to 9% of strontium fluoride (SrF$_2$),
23% to 24% of barium fluoride (BaF$_2$),
21% to 22% of aluminum fluoride (AlF$_3$).

Its calculated phosphorus content amounts to between 5.2% and 8.3%, by weight, and the calculated fluorine content to between 33.8% and 34.5%, by weight, while the ratio of fluorine to phosphorus (F/P) is between 4.1 and 6.5.

Still another glass E according to the present invention has the following composition, in weight percent:

COMPONENT (a):

14% to 19% of phosphorus pentoxide (P$_2$O$_5$),
0% to 7% of antimony trioxide (Sb$_2$O$_3$),
0% to 7% of molybdenum trioxide (MoO$_3$),
0% to 9% of tungsten trioxide (WO$_3$);

COMPONENT (b):

5% to 6% of magnesium fluoride (MgF$_2$),
17% to 18% of calcium fluoride (CaF$_2$),
8% to 9% of strontium fluoride (SrF$_2$),
23% to 24% of barium fluoride (BaF$_2$),
21% to 22% of aluminum fluoride (AlF$_3$).

In the resulting glass the calculated phosphorus content amounts to between 6.5 and 7.9%, by weight, and the calculated fluorine content amounts to 33.8%, by weight, while the ratio of fluorine to phosphorus (F/P) is between 4.3 and 5.2.

A glass F of the following composition has also proved to be of value:

COMPONENT (a) IN WEIGHT PERCENT:

13% to 16% of phosphorus pentoxide (P$_2$O$_5$),
1% to 3% of cadmium oxide (CdO),
1% to 4% of lead monoxide (PbO),
1% to 3% of antimony trioxide (Sb$_2$O$_3$),
0% to 2% of lanthanum oxide (La$_2$O$_3$),
0% to 2% of germanium dioxide (GeO$_2$),
0% to 1% of titanium dioxide (TiO$_2$),
0.5% to 2% of niobium pentoxide (Nb$_2$O$_5$),
0% to 1% of molybdenum trioxide (MoO$_3$),
0% to 2% of tungsten trioxide (WO$_3$);

COMPONENT (b) (IN WEIGHT PERCENT):

5% to 7% of magnesium fluoride (MgF$_2$),
17% to 18% of calcium fluoride (CaF$_2$),
8% to 9% of strontium fluoride (SrF$_2$),
23% to 24% of barium fluoride (BaF$_2$),
21% to 22% of aluminum fluoride (AlF$_3$).

In the resulting glass the calculated phosphorus content amounts to between 4.5% and 6.9%, by weight, and the calculated fluorine content amounts to 33.8%, by weight, while the ratio of fluorine to phosphorus (F/P) is between 4.9 and 7.5.

The glass G of the following composition, in weight percent, has proved to be useful:

COMPONENT (a):

14% to 15% of phosphorus pentoxide (P$_2$O$_5$),
9% to 10% of antimony trioxide (Sb$_2$O$_3$);

COMPONENT (b):

5% to 6% of magnesium fluoride (MgF$_2$),
5% to 18% of calcium fluoride (CaF$_2$),
10% to 11% of strontium fluroide (SrF$_2$),
21% to 34% of barium fluoride (BaF$_2$),
21% to 22% of aluminum fluoride (AlF$_3$).

In the resulting glass the calculated phosphorus content amounts to about 6.3%, by weight, the calculated fluorine content amounts to between about 30.8% and about 33.9%, by weight, while the ratio of fluorine to phosphorus (F/P) is between about 4.9 and about 5.4.

Likewise, a glass H of the following composition, in weight percent, has proved to be of value:

COMPONENT (a):

14% to 15% of phosphorus pentoxide ($P_2O_5$),
9% to 10% of antimony trioxide ($Sb_2O_3$);

COMPONENT (b):

5% to 6% of magnesium fluoride ($MgF_2$),
15% to 18% of calcium fluoride ($CaF_2$),
0% to 9% of strontium fluoride ($SrF_2$),
19% to 32% of barium fluoride ($BaF_2$),
0% to 4% of cadmium fluoride ($CdF_2$),
21% to 22% of aluminum fluoride ($AlF_3$).

In the resulting glass the calculated phosphorus content amounts to about 6.3%, by weight, and the calculated fluorine content amounts to between about 33.1% and about 33.9%, by weight, while the ratio of fluorine to phosphorus (F/P) is between about 5.3 and about 5.4.

A glass I which contains bismuth trifluoride of the following composition, in weight percent, can also be produced:

COMPONENT (a):

14% to 15% of phosphorus pentoxide ($P_2O_5$),
9% to 10% of antimony trioxide ($Sb_2O_3$);

COMPONENT (b):

5% to 6% of magnesium fluoride ($MgF_2$),
7% to 18% of calcium fluoride ($CaF_2$),
8% to 9% of strontium fluoride ($SrF_2$),
13% to 24% of barium fluoride ($BaF_2$),
21% to 22% of aluminum fluoride ($AlF_3$),
0% to 10% of bismuth trifluoride ($BiF_3$).

In the resulting glass the calculated phosphorus content amounts to about 6.3%, by weight, and the calculated fluorine content amounts to between about 31.1% and about 33.8%, by weight, while the ratio of flourine to phosphorus (F/P) is between about 4.9 and about 5.4.

Complex titanium fluorides are present in a glass J of the following composition, in weight percent:

COMPONENT (a):

14% to 15% of phosphorus pentoxide ($P_2O_5$)
9% to 10% of antimony trioxide ($Sb_2O_3$);

COMPONENT (b):

5% to 6% of magnesium fluoride ($MgF_2$),
11% to 18% of calcium fluoride ($CaF_2$),
0% to 9% of strontium fluoride ($SrF_2$),
23% to 24% of barium fluoride ($BaF_2$),
21% to 22% of aluminum fluoride ($AlF_3$);

COMPONENT (c):

0% to 15% of potassium titanium hexafluoride ($K_2TiF_6$),
0% to 7% of barium titanium hexafluoride ($BaTiF_6$).

In the resulting glass the calculated phosphorus content amounts to about 6.3%, by weight, and the calculated fluorine content amounts to between about 33.8% and about 35.2%, by weight, while the ratio of fluorine to phosphorus (F/P) is between about 5.4 and about 5.6.

A glass K of the following composition, in weight percent, which is also quite useful contains not only lead monoxide but also antimony trioxide and niobium pentoxide in addition to the other components. Such a glass has the following composition, in weight percent:

COMPONENT (a):

13% to 14% of phosphorus pentoxide ($P_2O_5$),
4% to 5% of lead monoxide (PbO),
3% to 4% of antimony trioxide ($Sb_2O_3$),
2% to 3% of niobium pentoxide ($Nb_2O_5$);

COMPONENT (b):

5% to 6% of magnesium fluoride ($MgF_2$),
17% to 18% of calcium fluoride ($CaF_2$),
8% to 9% of strontium fluoride ($SrF_2$),
0% to 24% of barium fluoride ($BaF_2$),
21% to 22% of aluminum fluoride ($AlF_3$);

COMPONENT (c):

0% to 24% of barium titanium hexafluoride ($BaTiF_6$).

In the resulting glass the calculated phosphorus content amounts to about 6.2%, by weight, and the calculated fluorine content amounts to between about 33.8% and about 37.6%, by weight, while the ratio of fluorine to phosphorus (F/P) is between about 5.5 and about 6.1.

Preferred and especially valuable fluorophosphate glasses according to the present invention are glasses in which the following components are present in the following amounts, in weight percent:

COMPONENT (a):

13.9% to 14.5% of phosphorus pentoxide ($P_2O_5$),
3.3% to 9.9% of antimony trioxide ($Sb_2O_3$),
4.9% of lead monoxide (PbO),
2.3% of niobium pentoxide ($Nb_2O_5$);

COMPONENT (b):

5.7% of magnesium fluoride ($MgF_2$),
17.3 % of calcium fluoride ($CaF_2$),
8.2% of strontium fluoride ($SrF_2$),
21.0% of aluminum fluoride ($AlF_3$),
23.4% of barium fluoride ($BaF_2$);

COMPONENT (c):

0% to 24.0% of barium titanium hexafluoride ($BaTiF_6$).

According to the present invention these glasses are produced by melting a mixture of glass-forming components, composed as follows, in weight percent:

COMPONENT (a):

0% to 9% of cadmium metaphosphate ($Cd(PO_3)_2$),
0% to 25% of lead metaphosphate ($Pb(PO_3)_2$),
0% to 33% of antimony trimetaphosphate ($Sb(PO_3)_3$),
0% to 22% of lanthanum metaphosphate ($La(PO_3)_3$),
0% to 5% of germanium tetrametaphosphate ($Ge(PO_3)_4$),
0% to 25% of titanium tetrametaphosphate ($Ti(PO_3)_4$),
0% to 25% of niobium pentametaphosphate ($Nb(PO_3)_5$),
0% to 25% of molybdenum hexametaphosphate ($Mo(PO_3)_6$),
0% to 25% of tungsten hexametaphosphate ($W(PO_3)_6$),
0% to 9% of lanthanum orthophosphate ($LaPO_4$);

COMPONENT (b):

3% to 7% of magnesium fluoride ($MgF_2$),
5% to 19% of calcium fluoride ($CaF_2$),
0% to 11% of strontium fluoride ($SrF_2$),
0% to 34% of barium fluoride ($BaF_2$),
0% to 4% of cadmium fluoride ($CdF_2$),
21% to 23% of aluminum fluoride ($AlF_3$),
0% to 10% of bismuth trifluoride ($BiF_3$);

COMPONENT (c):

0% to 6% of potassium hydrogen fluoride ($KHF_2$),
0% to 15% of potassium titanium hexafluoride ($K_2TiF_6$),
0% to 24% of barium titanium hexafluoride ($BaTiF_6$).

The alkaline earth metal fluoride components in such a mixture of glass-forming components to be melted amount to between about 40% and about 58%, by weight, while the sum of all the fluorides in the mixture amounts to between about 67% and about 80%, by weight, and the sum of the metaphosphates between about 16% and about 33%, by weight.

According to an especially advantageous melting procedure such a mixture is molten at a temperature between about 875° and about 930° C. The temperature of the melt is then increased to between about 1050° and about 1180° C. The melt is refined and homogenized at said temperature for 10 to 25 minutes. Thereupon it is allowed to cool to a temperature between about 600° and about 645° C. by discontinuing the heat supply while stirring. The thus cooled melt is then poured in a manner known per se into molds which are preferably preheated. The temperatures of melting, refining, and homogenizing, cooling and casting the glass melt may vary by ± 5%.

Various types of preferred glasses as they are described hereinabove, are obtained by melting, refining and homogenizing, cooling, and casting the following mixtures of glass components:

A suitable mixture of glass-forming components for melting glass A as given hereinabove, may consist of the following components, in weight percent:

COMPONENT (a):

20% to 33% of antimony trimetaphosphate ($Sb(PO_3)_3$);

COMPONENT (b):

3% to 7% of magnesium fluoride ($MgF_2$),
17% to 19% of calcium fluoride ($CaF_2$),
10% to 11% of strontium fluoride ($SrF_2$),
15% to 23% of barium fluoride ($BaF_2$),
21% to 23% of aluminum fluoride ($AlF_3$);

COMPONENT (c):

0% to 6% of potassium hydrogen fluoride ($KHF_2$).

The alkaline earth metal fluoride content of this mixture is between 46% and 58%, by weight, and the sum of all the fluorides is between 67% and 80%, by weight, of the mixture.

Another glass-forming mixture to melt glass B hereinabove is composed, in weight percent, as follows:

COMPONENT (a):

0% to 25% of lead metaphosphate ($Pb(PO_3)_2$),
0% to 25% of antimony trimetaphosphate ($Sb(PO_3)_3$),
0% to 25% of niobium pentametaphosphate ($Nb(PO_3)_5$);

COMPONENT (b):

5% to 6% of magnesium fluoride ($MgF_2$),
17% to 18% of calcium fluoride ($CaF_2$),
8% to 9% of strontium fluoride ($SrF_2$),
23% to 24% of barium fluoride ($BaF_2$),
21% to 22% of aluminum fluoride ($AlF_3$), The alkaline earth metal fluoride content of this mixture is 54.6%, by weight, while the sum of all fluorides is 75.6%, by weight and the sum of the metaphosphates is 25%, by weight.

Other glasses as given hereinabove are molten from glass-forming compositions composed, in weight percent, as follows:

GLASS C:

COMPONENT (a):

0% to 9% of cadmium metaphosphate ($Cd(PO_3)_2$),
2% to 25% of antimony trimetaphosphate ($Sb(PO_3)_3$),
0% to 22% of lanthanum metaphosphate ($La(PO_3)_3$);

COMPONENT (b):

5% to 6% of magnesium fluoride ($MgF_2$),
17% to 18% of calcium fluoride ($CaF_2$),
8% to 9% of strontium fluoride ($SrF_2$),
23% to 24% of barium fluoride ($BaF_2$),
21% to 22% of aluminum fluoride ($AlF_3$).

The alkaline earth metal fluoride content of this mixture is 54.6%, by weight, while the sum of all fluorides is 75.6%, by weight, and the sum of the metaphosphates is 25%, by weight.

GLASS D:

COMPONENT (a):

0% to 16% of antimony trimetaphosphate ($Sb(PO_3)_3$),
0% to 25% of titanium tetrametaphosphate ($Ti(PO_3)_4$),
0% to 9% of lanthanum orthophosphate ($LaPO_4$);

COMPONENT (b):

5% to 6% of magnesium fluoride ($MgF_2$),
17% to 18% of calcium fluoride ($CaF_2$),
8% to 9% of strontium fluoride ($SrF_2$),
23% to 24% of barium fluoride ($BaF_2$),
21% to 22% of aluminum fluoride ($AlF_3$).

The alkaline earth metal fluoride content of this mixture is between 54.6% and 55.9%, by weight, while the sum of all fluorides is between 75.6% and 77.4%, by weight, and the sum of the metaphosphates is between 16.0% and 24.4%, by weight.

GLASS E:

COMPONENT (a):

0% to 16% of antimony trimetaphosphate ($Sb(PO_3)_3$),
0% to 25% of molybdenum hexametaphosphate ($Mo(PO_3)_6$),
0% to 25% of tungsten hexametaphosphate ($W(PO_3)_6$);

COMPONENT (b):

5% to 6% of magnesium fluoride ($MgF_2$),
17% to 18% of calcium fluoride ($CaF_2$),
8% to 9% of strontium fluoride ($SrF_2$),
23% to 24% of barium fluoride ($BaF_2$)
21% to 22% of aluminum fluoride ($AlF_3$).

The alkaline earth metal fluoride content of this mixture is 54.6%, by weight, while the sum of all fluorides is 75.6% by weight, and the sum of the metaphosphates is 25%, by weight.

GLASS F:

COMPONENT (a):

2% to 6% of cadmium metaphosphate ($Cd(PO_3)_2$),
2% to 6% of lead metaphosphate ($Pb(PO_3)_2$),
2% to 6% of antimony trimetaphosphate ($Sb(PO_3)_3$), 0% to 4% of lanthanum metaphosphate (La(PO$_3$)$_3$),
0% to 5% of germanium tetrametaphosphate (Ge(PO$_3$)$_4$),
0% to 4% of titanium tetrametaphosphate (Ti(PO$_3$)$_4$),
2% to 7% of niobium pentametaphosphate (Nb(PO$_3$)$_5$),
0% to 3% of molybdenum hexametaphosphate (Mo(PO$_3$)$_6$),
0% to 3% of tungsten hexametaphosphate (W(PO$_3$)$_6$);

COMPONENT (b):

5% to 6% of magnesium fluoride (MgF$_2$),
17% to 18% of calcium fluoride (CaF$_2$),
8% to 9% of strontium fluoride (SrF$_2$),
23% to 24% of barium fluoride (BaF$_2$),
21% to 22% of aluminum fluoride (AlF$_3$).

The alkaline earth metal fluoride content of this mixture is 54.6%, by weight, while the sum of all fluorides is 75.6%, by weight, and the sum of the metaphosphates is 25%, by weight.

GLASS G:

COMPONENT (a):

24% to 25% of antimony trimetaphosphate (Sb(PO$_3$)$_3$);

COMPONENT (b):

5% to 6% of magnesium fluoride (MgF$_2$),
5% to 18% of calcium fluoride (CaF$_2$),
10% to 11% of strontium fluoride (SrF$_2$),
21% to 34% of barium fluoride (BaF$_2$),
21% to 22% of aluminum flouride (AlF$_3$).

The alkaline earth metal fluoride content of this mixture is 54.6%, by weight, and the sum of all fluorides is 75.6%, by weight.

GLASS H:

COMPONENT (a):

245 to 25% of antimony trimetaphosphate (Sb(PO$_3$)$_3$);

COMPONENT (b):

5% to 6% of magnesium fluoride (MgF$_2$),
15% to 18% of calcium fluoride (CaF$_2$),
0% to 9% of strontium fluoride (SrF$_2$),
19% to 32% of barium fluoride (BaF$_2$),
0% to 4% of cadmium fluoride (CdF$_2$),
21% to 22% of aluminum fluoride (AlF$_3$).

The alkaline earth metal fluoride content of this mixture is between 50.6% and 54.6%, by weight, while the sum of all fluorides is 75.6%, by weight.

GLASS I:

COMPONENT (a):

24% of antimony trimetaphosphate (Sb(PO$_3$)$_3$);

COMPONENT (b):

5% to 6% of magnesium fluoride (MgF$_2$),
7% to 18% of calcium fluoride (CaF$_2$),
8% to 9% of strontium fluoride (SrF$_2$),
13% to 24% of barium fluoride (BaF$_2$),
21% to 22% of aluminum fluoride (AlF$_3$),
0% to 10% of bismuth trifluoride (BiF$_3$).

The alkaline earth metal fluoride content of this mixture is between 44.6% and 54.6%, by weight, while the sum of all fluorides is 75.6%, by weight.

GLASS J:

COMPONENT (a):

24% to 25% of antimony trimetaphosphate (Sb(PO$_3$)$_3$);

COMPONENT (b):

5% to 6% of magnesium fluoride (MgF$_2$),
11% to 18% of calcium fluoride (CaF$_2$),
0% to 9% of strontium fluoride (SrF$_2$),
23% to 24% of barium fluoride (BaF$_2$),
21% to 22% of aluminum fluoride (AlF$_3$);

COMPONENT (c):

0% to 15% of potassium titanium hexafluoride (K$_2$TiF$_6$),
0% to 7% of barium titanium hexafluoride (BaTiF$_6$).

The alkaline earth metal fluoride content of this mixture is between 40.1% and 54.6%, by weight, while the sum of all fluorides if 75.6%, by weight.

GLASS K:

COMPONENT (a):

8% to 9% of lead metaphosphate (Pb(PO$_3$)$_2$),
8% to 9% of antimony trimetaphosphate (Sb(PO$_3$)$_3$),
8% to 9% of niobium pentametaphosphate (Nb(PO$_3$)$_5$);

COMPONENT (b):

5% to 6% of magnesium fluoride (MgF$_2$),
17% to 18% of calcium fluoride (CaF$_2$),
8% to 9% of strontium fluoride (SrF$_2$),
0% to 24% of barium fluoride (BaF$_2$),
21% to 22% of aluminum fluoride (AlF$_3$);

COMPONENT (c):

0% to 24% of barium titanium hexafluoride (BaTiF$_6$).

The alkaline earth metal fluoride content of this mixture is 54.6%, by weight, while the sum of all fluorides is 75.6%, by weight, and the sum of the metaphosphates is 24.4%, by weight.

The optical fluorophosphate glasses according to the present invention can be produced in the highly advantageous manner that their melts can be cooled and stirred to relatively low temperatures. Thus, casting of the melt into the mold can be carried out even at relatively high viscosity values of the melt. Only when proceeding in this manner, it is possible to satisfactorily homogenize the melt before it is poured into molds.

The glasses according to the present invention have the further advantage that they can be molten in relatively large charges and that surprisingly they do not show any partial differences in their indices of refraction. Furthermore, the glasses are highly stable and do not tend to crystallize.

BRIEF DESCRIPTION OF THE DRAWINGS

In the accompanying drawings the particular optical parameters of glasses produced according to the present invention are shown. In said drawings

DESCRIPTION OF THE PREFERRED EMBODIMENTS

Figure 1:
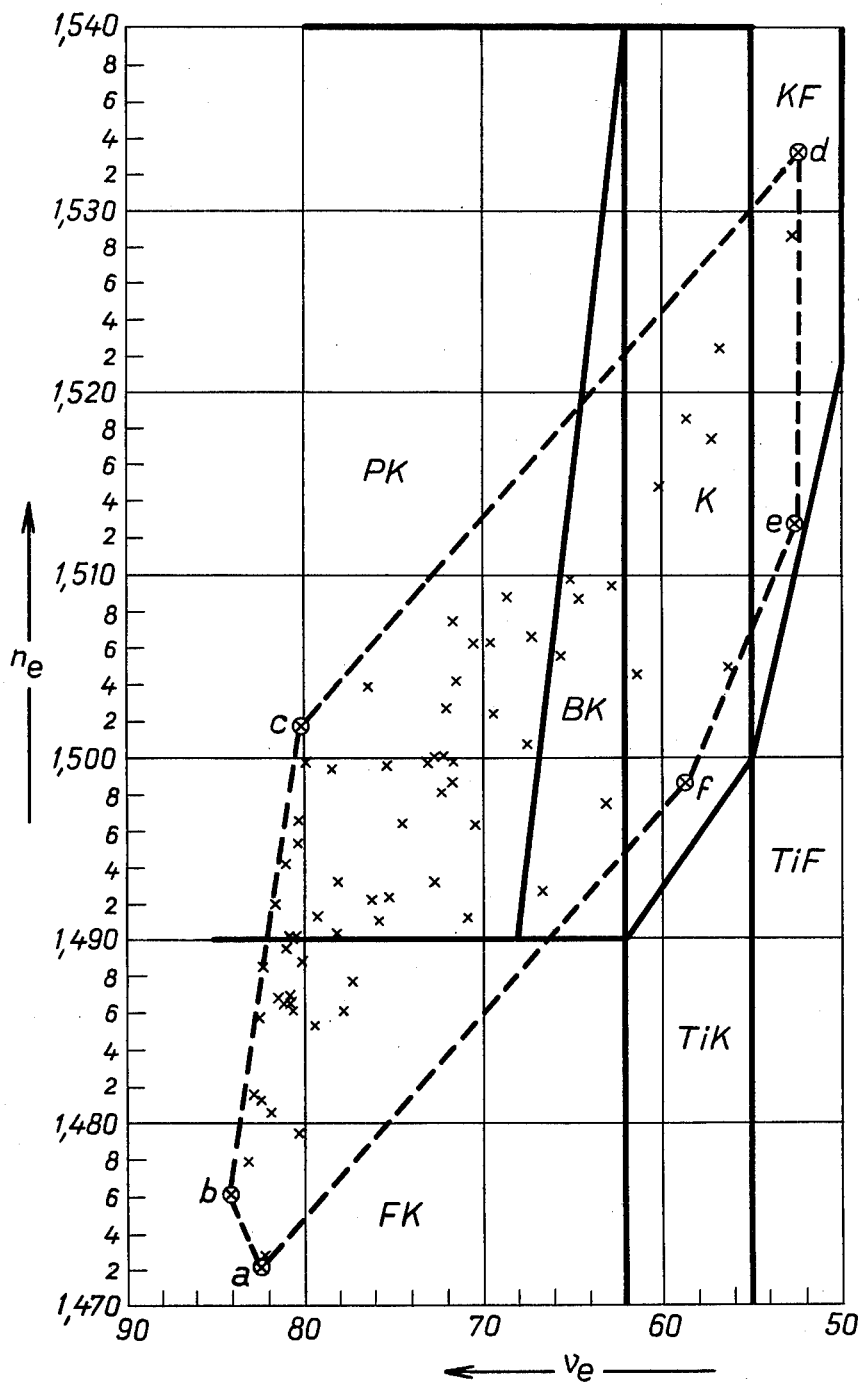
FIG. 1 shows the optical position range of the glasses according to the present invention in an $n_e$-$\nu_e$ diagram as compared with known glasses and FIG. 2 shows the optical position range of the glasses according to the present invention in a $\theta'_g \nu_e$ system of coordinates.

Fluorophosphate glasses according to the present invention are produced, for instance, by melting mixtures composed as listed in the following Tables 1 to 12 in which the amounts of glass-forming agents are given in weight percent.

TABLE 1

| Melt No. | 1 | 2 | 3 | 4 | 5 |
|---|---|---|---|---|---|
| $Sb(PO_3)_3$ | 24.4 | 26.4 | 30.4 | 22.4 | 20.4 |
| $MgF_2$ | 5.7 | 5.7 | 5.7 | 5.7 | 6.1 |
| $CaF_2$ | 17.3 | 17.3 | 17.3 | 17.7 | 18.1 |
| $SrF_2$ | 10.2 | 10.2 | 10.2 | 10.5 | 10.6 |
| $BaF_2$ | 15.4 | 15.4 | 15.4 | 22.1 | 22.6 |
| $AlF_3$ | 21.0 | 21.0 | 21.0 | 21.6 | 22.2 |
| $KHF_2$ | 6.0 | 4.0 | — | — | — |
| $\Sigma Me^x(PO_3)_x$ | 24.4 | 26.4 | 30.4 | 22.4 | 20.4 |
| $\Sigma(\text{fluorides})$ | 75.6 | 73.6 | 69.6 | 77.6 | 79.6 |
| $\Sigma(\text{alkaline earth metal fluorides})$ | 48.6 | 48.6 | 48.6 | 56.0 | 57.4 |
| $P_2O_5$ | 14.5 | 15.7 | 18.0 | 13.3 | 12.1 |
| $Sb_2O_3$ | 9.9 | 10.7 | 12.4 | 9.1 | 8.3 |
| P | 6.3 | 6.9 | 7.9 | 5.8 | 5.5 |
| F | 35.5 | 34.5 | 32.6 | 34.8 | 35.7 |
| F/P | 5.6 | 5.0 | 4.1 | 6.0 | 6.7 |
| $n_e$ | 1.4725 | 1.4794 | 1.4995 | 1.4815 | 1.4759 |
| $\nu_e$ | 82.2 | 80.3 | 78.4 | 82.8 | 84.1 |
| $\Theta'_g$ | 0.4784 | 0.4736 | 0.4711 | 0.4793 | 0.4751 |
| $+\Delta\nu_e$ | 19.9 | 14.6 | 10.9 | 17.3 | 19.6 |

TABLE 1-continued

| Melt No. | 6 | 7 | 40 | 41 |
|---|---|---|---|---|
| $Sb(PO_3)_3$ | 32.4 | 24.4 | 24.4 | 24.4 |
| $MgF_2$ | 3.7 | 5.7 | 5.7 | 5.7 |
| $CaF_2$ | 17.3 | 17.3 | 17.3 | 17.3 |
| $SrF_2$ | 10.2 | 8.2 | 10.2 | 10.2 |
| $BaF_2$ | 15.4 | 23.4 | 17.4 | 19.4 |
| $AlF_3$ | 21.0 | 21.0 | 21.0 | 21.0 |
| $KHF_2$ | — | — | 4.0 | 2.0 |
| $\Sigma Me^x(PO_3)_x$ | 32.4 | 24.4 | 24.4 | 24.4 |
| $\Sigma(\text{fluorides})$ | 67.6 | 75.6 | 75.6 | 75.6 |
| $\Sigma(\text{alkaline earth metal fluorides})$ | 46.6 | 54.6 | 50.6 | 52.6 |
| $P_2O_5$ | 19.2 | 14.5 | 14.5 | 14.5 |
| $Sb_2O_3$ | 13.2 | 9.9 | 9.9 | 9.9 |
| P | 8.4 | 6.3 | 6.3 | 6.3 |
| F | 31.4 | 33.8 | 35.0 | 34.5 |
| F/P | 3.7 | 5.4 | 5.6 | 5.5 |
| $n_e$ | 1.5083 | 1.4779 | 1.4722 | 1.4806 |
| $\nu_e$ | 76.4 | 83.0 | 82.4 | 81.8 |
| $\Theta'_g$ | 0.4726 | 0.4785 | 0.4710 | 0.4736 |
| $+\Delta\nu_e$ | 10.0 | 20.7 | 14.9 | 16.0 |

TABLE 2

| Melt No. | 8 | 9 | 10 | 11 | 12 | 13 | 14 |
|---|---|---|---|---|---|---|---|
| $Sb(PO_3)_3$ | 16.0 | 8.0 | — | 16.0 | 8.0 | — | 8.0 |
| $Pb(PO_3)_2$ | 8.4 | 16.4 | 24.4 | — | — | — | 8.0 |
| $Nb(PO_3)_5$ | — | — | — | 8.4 | 16.4 | 24.4 | 8.4 |
| $MgF_2$ | 5.7 | 5.7 | 5.7 | 5.7 | 5.7 | 5.7 | 5.7 |
| $CaF_2$ | 17.3 | 17.3 | 17.3 | 17.3 | 17.3 | 17.3 | 17.3 |
| $SrF_2$ | 8.2 | 8.2 | 8.2 | 8.2 | 8.2 | 8.2 | 8.2 |
| $BaF_2$ | 23.4 | 23.4 | 23.4 | 23.4 | 23.4 | 23.4 | 23.4 |
| $AlF_3$ | 21.0 | 21.0 | 21.0 | 21.0 | 21.0 | 21.0 | 21.0 |
| $\Sigma Me^x(PO_3)_x$ | 24.4 | 24.4 | 24.4 | 24.4 | 24.4 | 24.4 | 24.4 |
| $\Sigma(\text{fluorides})$ | 75.6 | 75.6 | 75.6 | 75.6 | 75.6 | 75.6 | 75.6 |
| $\Sigma(\text{alkaline earth metal fluorides})$ | 54.6 | 54.6 | 54.6 | 54.6 | 54.6 | 54.6 | 54.6 |
| $P_2O_5$ | 12.8 | 11.1 | 9.5 | 15.6 | 16.6 | 17.8 | 13.9 |
| $Sb_2O_3$ | 6.5 | 3.3 | — | 6.5 | 3.3 | — | 3.3 |
| PbO | 5.1 | 10.0 | 14.9 | — | — | — | 4.9 |
| $Nb_2O_5$ | — | — | — | 2.3 | 4.5 | 6.6 | 2.3 |
| P | 5.5 | 4.9 | 4.1 | 6.8 | 7.3 | 7.8 | 6.2 |
| F | 33.8 | 33.8 | 33.8 | 33.8 | 33.8 | 33.8 | 33.8 |
| F/P | 6.1 | 6.9 | 8.2 | 5.0 | 4.6 | 4.3 | 5.5 |
| $n_e$ | 1.4966 | 1.5001 | 1.5089 | 1.4963 | 1.5024 | 1.5099 | 1.5062 |
| $\nu_e$ | 75.5 | 72.2 | 68.6 | 74.4 | 69.4 | 65.1 | 70.4 |
| $\Theta'_g$ | 0.4830 | 0.4820 | 0.4908 | 0.4813 | 0.4901 | 0.4913 | 0.4891 |
| $+\Delta\nu_e$ | 16.1 | 12.4 | 14.4 | 14.1 | 15.3 | 11.7 | 15.6 |

TABLE 3

| Melt No. | 7 | 15 | 16 | 17 | 18 |
|---|---|---|---|---|---|
| $Sb(PO_3)_3$ | 24.4 | 16.0 | 16.0 | 8.0 | 2.4 |
| $Cd(PO_3)_2$ | — | 8.4 | — | — | — |
| $La(PO_3)_3$ | — | — | 8.4 | 16.4 | 22.0 |
| $MgF_2$ | 5.7 | 5.7 | 5.7 | 5.7 | 5.7 |
| $CaF_2$ | 17.3 | 17.3 | 17.3 | 17.3 | 17.3 |
| $SrF_2$ | 8.2 | 8.2 | 8.2 | 8.2 | 8.2 |
| $BaF_2$ | 23.4 | 23.4 | 23.4 | 23.4 | 23.4 |
| $AlF_3$ | 21.0 | 21.0 | 21.0 | 21.0 | 21.0 |
| $\Sigma Me^x(PO_3)_x$ | 24.4 | 24.4 | 24.4 | 24.4 | 24.4 |
| $\Sigma(\text{fluorides})$ | 75.6 | 75.6 | 75.6 | 75.6 | 75.6 |
| $\Sigma(\text{alkaline earth metal fluorides})$ | 54.6 | 54.6 | 54.6 | 54.6 | 54.6 |
| $P_2O_5$ | 14.5 | 13.9 | 14.3 | 14.0 | 13.5 |
| $Sb_2O_3$ | 9.9 | 6.5 | 6.5 | 3.3 | 1.0 |
| CdO | — | 4.0 | — | — | — |
| $La_2O_3$ | — | — | 3.6 | 7.1 | 9.9 |
| P | 6.3 | 6.0 | 6.2 | 6.2 | 6.0 |
| F | 33.8 | 33.8 | 33.8 | 33.8 | 33.8 |
| F/P | 5.4 | 5.6 | 5.5 | 5.5 | 5.6 |
| $n_e$ | 1.4779 | 1.4888 | 1.4861 | 1.4920 | 1.4942 |
| $\nu_e$ | 83.0 | 80.0 | 82.2 | 81.5 | 81.0 |
| $\Theta'_g$ | 0.4785 | 0.4815 | 0.4768 | 0.4805 | 0.4756 |
| $+\Delta\nu_e$ | 20.7 | 19.8 | 18.7 | 20.6 | 16.6 |

TABLE 4

| Melt No. | 19 | 20 | 21 | 22 | 23 | 24 |
|---|---|---|---|---|---|---|
| $Sb(PO_3)_3$ | 16.0 | 8.0 | — | — | — | 16.0 |
| $Ti(PO_3)_4$ | 8.4 | 16.4 | 24.4 | 22.6 | 23.3 | — |
| $LaPO_4$ | — | — | — | — | — | 8.4 |
| $MgF_2$ | 5.7 | 5.7 | 5.7 | 5.8 | 5.8 | 5.7 |
| $CaF_2$ | 17.3 | 17.3 | 17.3 | 17.7 | 17.6 | 17.3 |
| $SrF_2$ | 8.2 | 8.2 | 8.2 | 8.4 | 8.3 | 8.2 |
| $BaF_2$ | 23.4 | 23.4 | 23.4 | 24.0 | 23.7 | 23.4 |
| $AlF_3$ | 21.0 | 21.0 | 21.0 | 21.5 | 21.3 | 21.0 |
| $\Sigma Me^x(PO_3)_x$ | 24.4 | 24.4 | 24.4 | 22.6 | 23.3 | 16.0 |
| $\Sigma(\text{fluorides})$ | 75.6 | 75.6 | 75.6 | 77.4 | 76.7 | 75.6 |

TABLE 4-continued

| Melt No. | 19 | 20 | 21 | 22 | 23 | 24 |
|---|---|---|---|---|---|---|
| fluorides) | 54.6 | 54.6 | 54.6 | 55.9 | 55.4 | 54.6 |
| $P_2O_5$ | 16.1 | 17.5 | 19.0 | 17.6 | 18.2 | 12.0 |
| $Sb_2O_3$ | 6.5 | 3.3 | — | — | — | 6.5 |
| $TiO_2$ | 1.8 | 3.6 | 5.4 | 5.0 | 5.1 | — |
| $La_2O_3$ | — | — | — | — | — | 5.9 |
| P | 7.0 | 7.7 | 8.3 | 7.7 | 7.9 | 5.2 |
| F | 33.8 | 33.8 | 33.8 | 34.5 | 34.4 | 33.8 |
| F/P | 4.8 | 4.4 | 4.1 | 4.5 | 4.4 | 6.5 |
| $n_e$ | 1.4987 | 1.5094 | 1.5223 | 1.5149 | 1.5186 | 1.4858 |
| $\nu_e$ | 71.7 | 62.8 | 56.8 | 60.2 | 58.7 | 82.5 |
| $\Theta'_g$ | 0.4882 | 0.5000 | 0.5102 | 0.5029 | 0.5051 | 0.4799 |
| $+\Delta\nu_e$ | 16.2 | 15.6 | 16.8 | 15.1 | 15.1 | 20.2 |

TABLE 5

| Melt No. | 25 | 26 | 27 | 28 | 29 | 30 |
|---|---|---|---|---|---|---|
| $Sb(PO_3)_3$ | 16.0 | 8.0 | — | 16.0 | 8.0 | — |
| $Mo(PO_3)_6$ | 8.4 | 16.4 | 24.4 | — | — | — |
| $W(PO_3)_6$ | — | — | — | 8.4 | 16.4 | 24.4 |
| $MgF_2$ | 5.7 | 5.7 | 5.7 | 5.7 | 5.7 | 5.7 |
| $CaF_2$ | 17.3 | 17.3 | 17.3 | 17.3 | 17.3 | 17.3 |
| $SrF_2$ | 8.2 | 8.2 | 8.2 | 8.2 | 8.2 | 8.2 |
| $BaF_2$ | 23.4 | 23.4 | 23.4 | 23.4 | 23.4 | 23.4 |
| $AlF_3$ | 21.0 | 21.0 | 21.0 | 21.0 | 21.0 | 21.0 |
| $\Sigma Me^x(PO_3)_x$ | 24.4 | 24.4 | 24.4 | 24.4 | 24.4 | 24.4 |
| $\Sigma$(fluorides) | 75.6 | 75.6 | 75.5 | 75.6 | 75.6 | 75.6 |
| $\Sigma$(alkaline earth metal fluorides) | 54.6 | 54.6 | 54.6 | 54.6 | 54.6 | 54.6 |
| $P_2O_5$ | 15.8 | 17.0 | 18.2 | 14.9 | 15.3 | 15.8 |
| $Sb_2O_3$ | 6.5 | 3.3 | — | 6.5 | 3.3 | — |
| $MoO_3$ | 2.1 | 4.1 | 6.2 | — | — | — |
| $WO_3$ | — | — | — | 3.0 | 5.8 | 8.6 |
| P | 6.8 | 7.5 | 7.9 | 6.5 | 6.7 | 6.9 |
| F | 33.8 | 33.8 | 33.8 | 33.8 | 33.8 | 33.8 |
| F/P | 5.0 | 4.5 | 4.3 | 5.2 | 5.0 | 4.9 |
| $n_2$ | 1.4862 | 1.4913 | 1.4932 | 1.4877 | 1.4924 | 1.4994 |
| $\nu_e$ | 80.5 | 79.2 | 78.0 | 77.3 | 75.1 | 71.6 |
| $\Theta'_g$ | 0.4800 | 0.4795 | 0.4792 | 0.4799 | 0.4813 | 0.4877 |
| $+\Delta\nu_e$ | 19.3 | 17.6 | 16.1 | 15.9 | 14.8 | 15.7 |

TABLE 6

| Melt No. | 31 | 32 | 33 | 34 | 35 | 36 |
|---|---|---|---|---|---|---|
| $Sb(PO_3)_3$ | 6.0 | 5.0 | 4.4 | 3.5 | 3.0 | 2.7 |
| $Pb(PO_3)_2$ | 6.0 | 5.0 | 4.0 | 3.5 | 3.0 | 2.7 |
| $Cd(PO_3)_2$ | 6.0 | 5.0 | 4.0 | 3.5 | 3.0 | 2.7 |
| $La(PO_3)_3$ | — | — | — | 3.4 | 3.4 | 2.8 |
| $Ge(PO_3)_4$ | — | 4.4 | 4.0 | 3.5 | 3.0 | 2.7 |
| $Ti(PO_3)_4$ | — | — | 4.0 | 3.5 | 3.0 | 2.7 |
| $Nb(PO_3)_5$ | 6.4 | 5.0 | 4.0 | 3.5 | 3.0 | 2.7 |
| $W(PO_3)_6$ | — | — | — | — | 3.0 | 2.7 |
| $Mo(PO_3)_6$ | — | — | — | — | — | 2.7 |
| $MgF_2$ | 5.7 | 5.7 | 5.7 | 5.7 | 5.7 | 5.7 |
| $CaF_2$ | 17.3 | 17.3 | 17.3 | 17.3 | 17.3 | 17.3 |
| $SrF_2$ | 8.2 | 8.2 | 8.2 | 8.2 | 8.2 | 8.2 |
| $BaF_2$ | 23.4 | 23.4 | 23.4 | 23.4 | 23.4 | 23.4 |
| $AlF_3$ | 21.0 | 21.0 | 21.0 | 21.0 | 21.0 | 210 |
| $\Sigma Me^x(PO_3)_x$ | 24.4 | 24.4 | 24.4 | 24.4 | 24.4 | 24.4 |
| $\Sigma$(fluorides) | 75.6 | 75.6 | 75.6 | 75.6 | 75.6 | 75.6 |
| $\Sigma$(alkaline earth metal fluorides | 54.6 | 54.6 | 54.6 | 54.6 | 54.6 | 54.6 |
| $P_2O_5$ | 13.8 | 14.3 | 15.2 | 15.0 | 15.1 | 15.6 |
| $Sb_2O_3$ | 2.4 | 2.0 | 1.8 | 1.4 | 1.2 | 1.1 |
| PbO | 3.7 | 3.1 | 2.4 | 2.1 | 1.8 | 1.6 |
| CdO | 2.8 | 2.4 | 1.9 | 1.7 | 1.4 | 1.2 |
| $La_2O_3$ | — | — | — | 1.5 | 1.5 | 1.2 |
| $GeO_2$ | — | 1.2 | 1.2 | 0.9 | 0.8 | 0.7 |
| $TiO_2$ | — | — | 0.9 | 0.8 | 0.7 | 0.6 |
| $Nb_2O_5$ | 1.7 | 1.4 | 1.0 | 1.0 | 0.8 | 0.7 |
| $WO_3$ | — | — | — | — | 1.1 | 1.0 |
| $MoO_3$ | — | — | — | — | — | 0.7 |
| P | 4.5 | 4.9 | 5.3 | 6.5 | 6.6 | 6.9 |
| F | 33.8 | 33.8 | 33.8 | 33.8 | 33.8 | 33.8 |
| F/P | 7.5 | 6.9 | 6.4 | 5.2 | 5.1 | 4.9 |
| $n_e$ | 1.4981 | 1.4998 | 1.5063 | 1.5027 | 1.5042 | 1.5075 |
| $\nu_e$ | 72.3 | 73.0 | 69.6 | 72.0 | 71.4 | 71.7 |
| $\Theta'_g$ | 0.4867 | 0.4846 | 0.4888 | 0.4872 | 0.4867 | 0.4887 |
| $+\Delta\nu_e$ | 15.8 | 15.0 | 14.6 | 15.6 | 14.8 | 16.6 |

TABLE 7

| Melt No. | 43 | 44 | 45 | 46 | 47 | 48 | 49 |
|---|---|---|---|---|---|---|---|
| $Sb(PO_3)_3$ | 24.4 | 24.4 | 24.4 | 24.4 | 24.4 | 24.4 | 24.4 |
| $MgF_2$ | 5.7 | 5.7 | 5.7 | 5.7 | 5.7 | 5.7 | 5.7 |

TABLE 7-continued

| Melt No. | 43 | 44 | 45 | 46 | 47 | 48 | 49 |
|---|---|---|---|---|---|---|---|
| CaF$_2$ | 17.3 | 15.3 | 13.3 | 11.3 | 9.3 | 7.3 | 5.3 |
| SrF$_2$ | 10.2 | 10.2 | 10.2 | 10.2 | 10.2 | 10.2 | 10.2 |
| BaF$_2$ | 21.4 | 23.4 | 25.4 | 27.4 | 29.4 | 31.4 | 33.4 |
| AlF$_3$ | 21.0 | 21.0 | 21.0 | 21.0 | 21.0 | 21.0 | 21.0 |
| ΣMe$^x$(PO$_3$)$_x$ | 24.4 | 24.4 | 24.4 | 24.4 | 24.4 | 24.4 | 24.4 |
| Σfluorides | 75.6 | 75.6 | 75.6 | 75.6 | 75.6 | 75.6 | 75.6 |
| Σ(alkaline earth metal fluorides) | 54.6 | 54.6 | 54.6 | 54.6 | 54.6 | 54.6 | 54.6 |
| P$_2$O$_5$ | 14.5 | 14.5 | 14.5 | 14.5 | 14.5 | 14.5 | 14.5 |
| Sb$_2$O$_3$ | 9.9 | 9.9 | 9.9 | 9.9 | 9.9 | 9.9 | 9.9 |
| P | 6.3 | 6.3 | 6.3 | 6.3 | 6.3 | 6.3 | 6.3 |
| F | 33.9 | 33.5 | 32.9 | 32.4 | 31.8 | 31.1 | 30.8 |
| F/P | 5.4 | 5.3 | 5.2 | 5.1 | 5.0 | 5.0 | 4.9 |
| n$_e$ | 1.4896 | 1.4902 | 1.4902 | 1.4953 | 1.4966 | 1.5018 | 1.4993 |
| ν$_e$ | 80.9 | 80.5 | 80.8 | 80.3 | 80.2 | 80.1 | 79.8 |
| Θ″$_g$ | 0.4789 | 0.4779 | 0.4763 | 0.4792 | 0.4753 | 0.4799 | 0.4742 |
| +Δν$_e$ | 18.9 | 17.8 | 17.0 | 18.5 | 15.8 | 18.8 | 14.5 |

The optical fluorophosphate glasses of Melts No. 43 to 49 thus are characterized by being composed of the following components in about the following amounts, in weight percent:

| Oxide components (a): | |
|---|---|
| Phosphorus pentoxide (P$_2$O$_5$) | 14.5% |
| Antimony trioxide (Sb$_2$O$_3$) | 9.9% |
| Fluoride components (b): | |
| Magnesium fluoride (MgF$_2$) | 5.7% |
| Strontium fluoride (SrF$_2$) | 10.2% |
| Aluminum fluoride (AlF$_3$) | 21.0% | while calcium fluoride (CaF$_2$) and barium fluoride (BaF$_2$) are present in amounts sufficient to make up 100%.

TABLE 8

| Melt No. | 50 | 51 | 52 | 53 | 54 | 55 | 56 |
|---|---|---|---|---|---|---|---|
| Sb(PO$_3$)$_3$ | 24.4 | 24.4 | 24.4 | 24.4 | 24.4 | 24.4 | 24.4 |
| MgF$_2$ | 5.7 | 5.7 | 5.7 | 5.7 | 5.7 | 5.7 | 5.7 |
| CaF$_2$ | 17.3 | 17.3 | 17.3 | 17.3 | 15.3 | 17.3 | 17.3 |
| SrF$_2$ | 6.2 | 4.2 | 2.2 | — | 8.2 | 8.2 | 8.2 |
| BaF$_2$ | 25.4 | 27.4 | 29.4 | 31.4 | 23.4 | 21.4 | 19.4 |
| AlF$_3$ | 21.0 | 21.0 | 21.0 | 21.2 | 21.0 | 21.0 | 21.0 |
| CdF$_2$ | — | — | — | — | 2.0 | 2.0 | 4.0 |
| ΣMe$^x$(PO$_3$)$_x$ | 24.4 | 24.4 | 24.4 | 24.4 | 24.4 | 24.4 | 24.4 |
| Σ(fluorides) | 75.6 | 75.6 | 75.6 | 75.6 | 75.6 | 75.6 | 75.6 |
| Σ(alkaline earth metal fluorides) | 54.6 | 54.6 | 54.6 | 54.4 | 52.6 | 52.6 | 50.6 |
| P$_2$O$_5$ | 14.5 | 14.5 | 14.5 | 14.5 | 14.5 | 14.5 | 14.5 |
| Sb$_2$O$_3$ | 9.9 | 9.9 | 9.9 | 9.9 | 9.9 | 9.9 | 9.9 |
| P | 6.3 | 6.3 | 6.3 | 6.3 | 6.3 | 6.3 | 6.3 |
| F | 33.6 | 33.5 | 33.3 | 33.1 | 33.4 | 33.8 | 33.9 |
| F/P | 5.3 | 5.3 | 5.3 | 5.3 | 5.3 | 5.4 | 5.4 |
| n$_e$ | 1.4812 | 1.4905 | 1.4869 | 1.4865 | 1.4866 | 1.4868 | 1.4952 |
| ν$_e$ | 82.5 | 80.6 | 81.4 | 81.1 | 80.9 | 80.8 | 80.3 |
| Θ″$_g$ | 0.4769 | 0.4763 | 0.4768 | 0.4772 | 0.4776 | 0.4788 | 0.4776 |
| +Δν$_e$ | 19.1 | 16.9 | 17.9 | 17.9 | 18.0 | 18.7 | 17.4 |

The preferred optical fluorophosphate glasses of Melts No. 54 to 56 are characterized by being composed of the following components in about the following amounts, in weight percent:

| Oxide components (a): | |
|---|---|
| Phosphorus pentoxide (P$_2$O$_5$) | 14.5% |
| Antimony trioxide (Sb$_2$O$_3$) | 9.9% |
| Fluoride components (b): | |
| Magnesium fluoride (MgF$_2$) | 5.7% |
| Aluminum fluoride (AlF$_3$) | 21.0%, | while calcium fluoride (CaF$_2$), strontium fluoride (SrF$_2$), barium fluoride (BaF$_2$), and cadmium fluoride (CdF$_2$) are present in amounts sufficient to make up 100%.

TABLE 9

| Melt No. | 57 | 58 | 59 | 60 | 61 |
|---|---|---|---|---|---|
| Sb(PO$_3$)$_3$ | 24.4 | 24.4 | 24.4 | 24.4 | 24.4 |
| MgF$_2$ | 5.7 | 5.7 | 5.7 | 5.7 | 5.7 |
| CaF$_2$ | 15.3 | 13.3 | 11.3 | 9.3 | 7.3 |
| SrF$_2$ | 8.2 | 8.2 | 8.2 | 8.2 | 8.2 |
| BaF$_2$ | 23.4 | 23.4 | 23.4 | 23.4 | 23.4 |
| AlF$_3$ | 21.0 | 21.0 | 21.0 | 21.0 | 21.0 |
| BiF$_3$ | 2.0 | 4.0 | 6.0 | 8.0 | 10.0 |
| ΣMe$^x$(PO$_3$)$_x$ | 24.4 | 24.4 | 24.4 | 24.4 | 24.4 |
| Σ(fluorides) | 75.6 | 75.6 | 75.6 | 75.6 | 75.6 |
| Σ(alkaline earth metal fluorides) | 52.6 | 50.6 | 48.6 | 46.6 | 44.6 |
| P$_2$O$_5$ | 14.5 | 14.5 | 14.5 | 14.5 | 14.5 |
| Sb$_2$O$_3$ | 9.9 | 9.9 | 9.9 | 9.9 | 9.9 |
| P | 6.3 | 6.3 | 6.3 | 6.3 | 6.3 |
| F | 33.3 | 32.8 | 32.2 | 31.6 | 31.1 |
| F/P | 5.3 | 5.2 | 5.1 | 5.0 | 4.9 |
| n$_e$ | 1.4853 | 1.4922 | 1.5000 | 1.5059 | 1.5068 |
| ν$_e$ | 79.4 | 76.2 | 72.7 | 69.6 | 67.4 |
| Θ″$_g$ | 0.4828 | 0.4856 | 0.4868 | 0.4899 | 0.4904 |
| +Δν$_e$ | 20.1 | 18.9 | 16.2 | 15.3 | 13.5 |

The optical fluorophosphate glasses of Melts No. 57 to 61 thus are characterized by being composed of the following components in about the following amounts, in weight percent:

| Oxide components (a): | |
|---|---|
| Phosphorus pentoxide (P$_2$O$_5$) | 14.5% |
| Antimony trioxide (Sb$_2$O$_3$) | 9.9% |

-continued

| Fluoride components (b): | |
|---|---|
| Magnesium fluoride (MgF$_2$) | 5.7% |
| Strontium fluoride (SrF$_2$) | 8.2% |
| Barium fluoride (BaF$_2$) | 23.4% |
| Aluminum fluoride (AlF$_3$) | 21.0% | while calcium fluoride (CaF$_2$) and bismuth trifluoride (BiF$_3$) are present in amounts sufficient to make up 100%.

TABLE 10

| Melt No. | 62 | 63 | 64 | 65 | 66 |
|---|---|---|---|---|---|
| Sb(PO$_3$)$_3$ | 24.4 | 24.4 | 24.4 | 24.4 | 24.4 |
| MgF$_2$ | 5.7 | 5.7 | 5.7 | 5.7 | 5.7 |
| CaF$_2$ | 17.3 | 17.3 | 17.3 | 17.3 | 17.3 |
| SrF$_2$ | 8.2 | 8.2 | 8.2 | 8.2 | 8.2 |
| BaF$_2$ | 21.4 | 19.4 | 17.4 | 15.4 | 13.4 |
| AlF$_3$ | 21.0 | 21.0 | 21.0 | 21.0 | 21.0 |
| BiF$_3$ | 2.0 | 4.0 | 6.0 | 8.0 | 10.0 |
| ΣMe$^x$(PO$_3$)$_x$ | 24.4 | 24.4 | 24.4 | 24.4 | 24.4 |
| Σ(fluorides) | 75.6 | 75.6 | 75.6 | 75.6 | 75.6 |
| Σ(alkaline earth metal fluorides) | 52.6 | 50.6 | 48.6 | 46.6 | 44.6 |
| P$_2$O$_5$ | 14.5 | 14.5 | 14.5 | 14.5 | 14.5 |
| Sb$_2$O$_3$ | 9.9 | 9.9 | 9.9 | 9.9 | 9.9 |
| P | 6.3 | 6.3 | 6.3 | 6.3 | 6.3 |
| F | 33.7 | 33.8 | 33.8 | 33.7 | 33.7 |
| F/P | 5.3 | 5.4 | 5.4 | 5.3 | 5.3 |
| n$_e$ | 1.4903 | 1.4911 | 1.4932 | 1.4964 | 1.5008 |
| ν$_e$ | 78.0 | 75.7 | 72.6 | 70.3 | 67.6 |
| Θ′$_e$ | 0.4816 | 0.4827 | 0.4867 | 0.4880 | 0.4910 |
| +Δν$_e$ | 17.8 | 16.4 | 16.1 | 14.7 | 14.2 |

The optical fluorophosphate glasses of Melts No. 62 to 66 thus are characterized by being composed of the following components in about the following amounts, in weight percent:

| Oxide components (a): | |
|---|---|
| Phosphorus pentoxide (P$_2$O$_5$) | 14.5% |
| Antimony trioxide (Sb$_2$O$_3$) | 9.9% |
| Fluoride components (b): | |
| Magnesium fluoride (MgF$_2$) | 5.7% |
| Calcium fluoride (CaF$_2$) | 17.3% |
| Strontium fluoride (SrF$_2$) | 8.2% |
| Aluminum fluoride (AlF$_3$) | 21.0% | while barium fluoride (BaF$_2$) and bismuth trifluoride (BiF$_3$) are present in amounts sufficient to make up 100%.

TABLE II

| Melt No. | 67 | 68 | 69 | 70 | 71 | 72 | 73 |
|---|---|---|---|---|---|---|---|
| Sb(PO$_3$)$_3$ | 24.4 | 24.4 | 24.4 | 24.4 | 24.4 | 24.4 | 24.4 |
| MgF$_2$ | 5.7 | 5.7 | 5.7 | 5.7 | 5.7 | 5.7 | 5.7 |
| CaF$_2$ | 17.3 | 17.3 | 17.3 | 15.0 | 13.0 | 11.0 | 13.0 |
| SrF$_2$ | 6.2 | 2.2 | — | — | — | — | — |
| BaF$_2$ | 23.4 | 23.4 | 23.4 | 23.4 | 23.4 | 23.4 | 23.4 |
| AlF$_3$ | 21.0 | 21.0 | 21.0 | 21.0 | 21.0 | 21.0 | 21.0 |
| K$_2$TiF$_6$ | 2.0 | 6.0 | 8.2 | 10.5 | 12.5 | 14.5 | 6.0 |
| BaTiF$_6$ | — | — | — | — | — | — | 6.5 |
| ΣMe$^x$(PO$_3$)$_x$ | 24.4 | 24.4 | 24.4 | 24.4 | 24.4 | 24.4 | 24.4 |
| Σ(fluorides) | 75.6 | 75.6 | 75.6 | 75.6 | 75.6 | 75.6 | 75.6 |
| Σ(alkaline earth metal fluorides) | 52.6 | 48.6 | 46.4 | 44.1 | 42.1 | 40.1 | 48.6 |
| P$_2$O$_5$ | 14.5 | 14.5 | 14.5 | 14.5 | 14.5 | 14.5 | 14.5 |
| Sb$_2$O$_3$ | 9.9 | 9.9 | 9.9 | 9.9 | 9.9 | 9.9 | 9.9 |
| P | 6.3 | 6.3 | 6.3 | 6.3 | 6.3 | 6.3 | 6.3 |
| F | 34.3 | 34.8 | 35.2 | 35.2 | 35.1 | 35.2 | 34.5 |
| F/P | 5.4 | 5.5 | 5.6 | 5.6 | 5.6 | 5.6 | 5.5 |
| n$_e$ | 1.4861 | 1.4912 | 1.4927 | 1.4977 | 1.4986 | 1.5050 | 1.5046 |
| ν$_e$ | 77.7 | 70.8 | 66.6 | 63.1 | 58.7 | 56.3 | 61.4 |
| Θ′$_e$ | 0.4815 | 0.4915 | 0.4962 | 0.5020 | 0.5089 | 0.5127 | 0.5029 |
| +Δν$_e$ | 17.5 | 17.5 | 16.8 | 17.3 | 17.8 | 18.1 | 16.3 |

The preferred optical fluorophosphate glasses of Melts No. 67 and 68 are characterized by being composed of the following components in about the following amounts, in weight percent:

| Oxide components (a): | |
|---|---|
| Phosphorus pentoxide (P$_2$O$_5$) | 14.5% |
| Antimony trioxide (Sb$_2$O$_3$) | 9.9% |
| Fluoride components (b): | |
| Magnesium fluoride (MgF$_2$) | 5.7% |
| Barium fluoride (BaF$_2$) | 23.4 |
| Aluminum fluoride (AlF$_3$) | 21.0%, | while calcium fluoride (CaF$_2$), strontium fluoride (SrF$_2$), and the potassium titanium hexafluoride (K$_2$TiF$_6$) are present in amounts sufficient to make up 100%.

TABLE 2

| Melt No. | 14 | 75 | 76 | 77 | 78 | 79 |
|---|---|---|---|---|---|---|
| Sb(PO$_3$)$_3$ | 8.0 | 8.0 | 8.0 | 8.0 | 8.0 | 8.0 |
| Pb(PO$_3$)$_3$ | 8.0 | 8.0 | 8.0 | 8.0 | 8.0 | 8.0 |
| Nb(PO$_3$)$_5$ | 8.4 | 8.4 | 8.4 | 8.4 | 8.4 | 8.4 |
| MgF$_2$ | 5.7 | 5.7 | 5.7 | 5.7 | 5.7 | 5.7 |
| CaF$_2$ | 17.3 | 17.3 | 17.3 | 17.3 | 17.3 | 17.3 |
| SrF$_2$ | 8.2 | 8.2 | 8.2 | 8.2 | 8.2 | 8.2 |
| BaF$_2$ | 23.4 | 18.4 | 13.4 | 8.4 | 3.4 | — |
| AlF$_3$ | 21.0 | 21.0 | 21.0 | 21.0 | 21.0 | 21.0 |
| BaTiF$_6$ | — | 5.0 | 10.0 | 15.0 | 20.0 | 23.4 |
| ΣMe$^x$(PO$_3$)$_x$ | 24.4 | 24.4 | 24.4 | 24.4 | 24.4 | 24.4 |
| Σ(fluorides) | 75.6 | 75.6 | 75.6 | 75.6 | 75.6 | 75.6 |
| Σ(alkaline earth metal fluorides) | 54.6 | 54.6 | 54.6 | 54.6 | 54.6 | 54.6 |
| P$_2$O$_5$ | 13.9 | 13.9 | 13.9 | 13.9 | 13.9 | 13.9 |
| Sb$_2$O$_3$ | 3.3 | 3.3 | 3.3 | 3.3 | 3.3 | 3.3 |
| PbO | 4.9 | 4.9 | 4.9 | 4.9 | 4.9 | 4.9 |
| Nb$_2$O$_5$ | 2.3 | 2.3 | 2.3 | 2.3 | 2.3 | 2.3 |

TABLE 2-continued

| Melt No. | 14 | 75 | 76 | 77 | 78 | 79 |
|---|---|---|---|---|---|---|
| P | 6.2 | 6.2 | 6.2 | 6.2 | 6.2 | 6.2 |
| F | 33.8 | 34.6 | 35.4 | 36.2 | 37.0 | 37.6 |
| F/P | 5.5 | 5.6 | 5.7 | 5.8 | 6.0 | 6.1 |
| $n_e$ | 1.5062 | 1.5088 | 1.5148 | 1.5174 | 1.5288 | 1.5331 |
| $v_e$ | 70.4 | 64.6 | 60.3 | 57.2 | 52.6 | 51.9 |
| $\Theta'_g$ | 0.4891 | 0.4959 | 0.4988 | 0.5047 | 0.5121 | 0.5153 |
| $+\Delta v_e$ | 15.6 | 14.6 | 12.3 | 13.4 | 13.9 | 15.5 |

The preferred optical fluorophosphate glasses of Melts No. 75 to 78 are characterized by being composed of the following components in about the following amounts, in weight percent:

| Oxide components (a): | |
|---|---|
| Phosphorus pentoxide ($P_2O_5$) | 13.9% |
| Antimony trioxide ($Sb_2O_3$) | 3.3% |
| Lead monoxide (PbO) | 4.9% |
| Niobium pentoxide ($Nb_2O_5$) | 2.3% |
| Fluoride components (b): | |
| Magnesium fluoride ($MgF_2$) | 5.7% |
| Calcium fluoride ($CaF_2$) | 17.3% |
| Strontium fluoride ($SrF_2$) | 8.2% |
| Aluminum fluoride ($AlF_3$) | 21.0%, | while barium fluoride ($BaF_2$), and the complex barium tatanium hexafluoride $Ba(TiF_6)$ is present in an amounts sufficient to make up 100%.

The graph illustrated in FIG. 1 shows part of the known optical position range in an $n_e$-$v_e$ diagram, i.e. the index of refraction $n_e$ is plotted on the ordinate and the Abbe number on the abscissa.

All the examples given in the Tables are indicated by an X and are plotted in said system of coordinates. The range covered by the Abbe values $v_e$ and the indices of refraction $n_e$ belonging thereto as corresponding to each of the disclosed examples is appropriately circumscribed by a polygon constructed by connecting by straight lines the points a to f indicated by circles with an X therein. The coordinates of these points a to f correspond to the respective $n_e$-$v_e$ values of the following examples.

| Point | Melt No. | Table |
|---|---|---|
| a | 40 | 1 |
| b | 5 | 1 |
| c | 48 | 7 |
| d | 79 | 12 |
| e | 78 | 12 |
| f | 71 | 11 |

Figure 2:
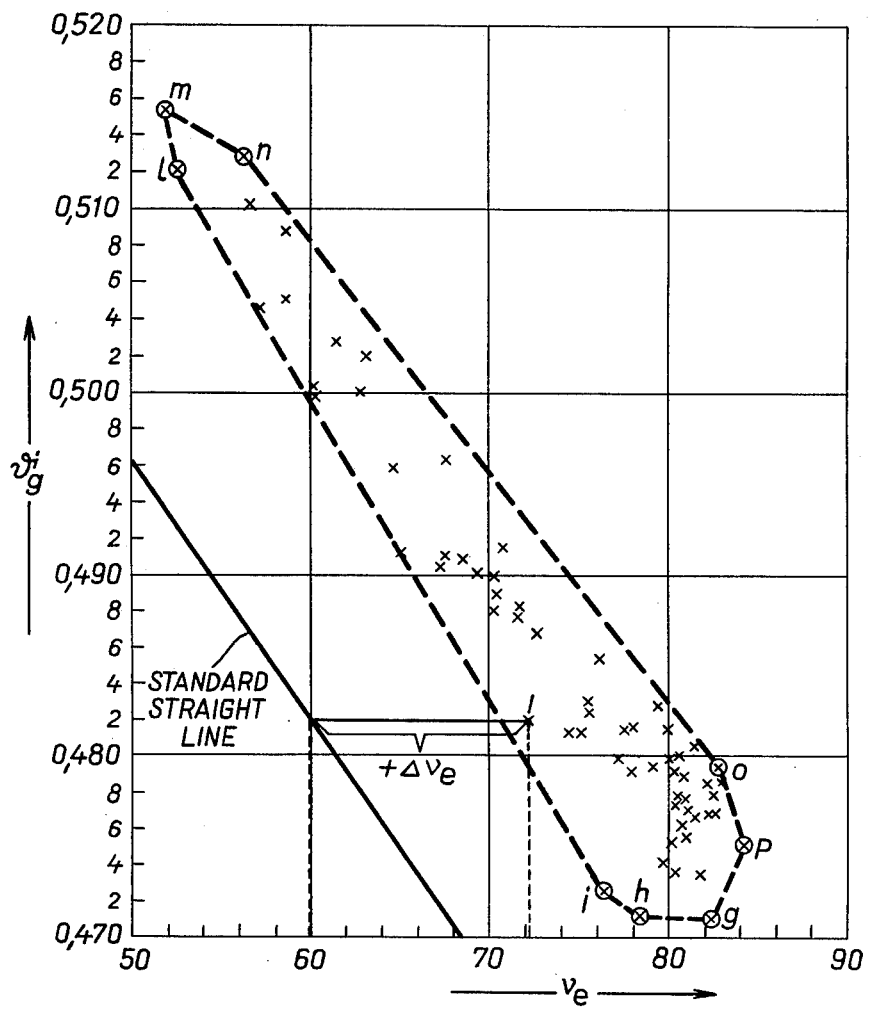

FIG. 2 shows the position of each individual value listed in the Tables in a system of coordinates $\phi'_g$-$v_e$ in which the $\phi'_e$ values are plotted as ordinate while the Abbe numbers $v_e$ are plotted as abscissa. FIG. 2 thus illustrates graphically the third important optical parameter of the fluorophosphate glasses according to the present invention, namely the positive anomalous partial dispersion value $+\Delta v_e$.

As is known, the following mathematical relationship applies to the ordinate value $\phi'_g$ and the abscissa value $v_e$:

$$\theta_g = \frac{n_g - n_{F'}}{n_{F'} - n_{C'}}; \qquad v_e = \frac{n_e - 1}{n_{F'} - n_{C'}}.$$

The subscript indices e, g, C', and F' of the equations given hereinabove indicate spectral wave lengths or spectral lines, namely e = green mercury line of the wave length of 546.07 nm.

g = blue mercury line of the wave length of 435.84 nm.

F' = blue cadmium line of the wave length of 479.99 nm.

C' = red cadmium line of the wave length of 643.85 nm.

It is evident that all the glasses according to the present invention as plotted in FIG. 2 are positioned far to the right of the so-called "standard straight line". All of them thus have a relatively large positive anomalous dispersion value $+\Delta v_e$, i.e. they are $(+\Delta v_e)$ glasses of a higher $v_e$ value than a "standard glass" positioned on the standard straight line. For instance, the deviation from the standard straight line of the point r selected at random (Example 9 of Table 2) amounts to the following value:

$$\Delta v_e = 72.2 - 59.8 = +12.4.$$

The examples plotted in FIG. 2 are circumscribed by a polygon, the points g to p of which are to be associated with the following examples:

| Point | Melt No. | Table |
|---|---|---|
| g | 40 | 1 |
| h | 3 | 1 |
| i | 6 | 1 |
| l | 78 | 12 |
| m | 79 | 12 |
| n | 72 | 11 |
| o | 4 | 1 |
| p | 5 | 1 |

Table 1 illustrates glasses in which antimony trimetaphosphate $(Sb(PO_3)_3)$ together with fluorides are used as the sole glass-forming agents. The six or, respectively, seven components of such glasses are given in the first horizontal column in the weight percent amounts in which they are added to the melt mixture.

The second group of horizontal columns shows first the sum of the metaphosphates indicated as follows: $\Sigma Me^x(PO_3)_x$, whereby x represents the cation valencies between 2 and 6. Thereafter the sum of all fluorides including those of potassium hydrogen fluoride ($KHF_2$) and of the complex fluorides ($K_2TiF_6$, $BaTiF_6$) and finally the sum of the alkaline earth metal fluorides are given.

In the third group of horizontal columns there are listed the metaphosphates and/or, respectively, lanthanum orthophosphate ($LaPO_4$) (compare Table 4) indicated in the form of their oxidic components, i.e. calculated as the stable oxide of the respective cation and as phosphorus pentoxide ($P_2O_5$).

The next group of horizontal columns shows first the calculated phosphorus amount (P), thereafter the fluorine content (F), and finally the quotient fluorine to phosphorus (F/P).

The last group of horizontal columns gives the measured or calculated optical parameters $n_e$, $v_e$, $\Theta'_g$, and $+\Delta v_e$.

In Table 2 the antimony trimetaphosphate (Sb(PO$_3$)$_3$) is wholly or partly replaced by lead metaphosphate (Pb(PO$_3$)$_2$) and/or niobium pentametaphosphate (Nb(PO$_3$)$_5$).

Table 3 shows variations of the example of melt No. 7 as given in Table 1, whereby the effect of a partial replacement of the antimony trimetaphosphate (Sb(PO$_3$)$_3$) by cadmium metaphosphate (Cd(PO$_3$)$_2$) or lanthanum metaphosphate (La(PO$_3$)$_3$) upon the optical parameters is demonstrated.

Table 4 illustrates the partial or total replacement of antimony trimetaphosphate by titanium tetrametaphosphate (Ti(PO$_3$)$_4$) or lanthanum orthophosphate (LaPO$_4$) and the modification of the optical parameters by such a replacement. It is to be noted that in melt No. 24 the lanthanum orthophosphate is not included in the sum of the metaphosphates Me$^x$(PO$_3$)$_x$.

In Tables 5 and 6 there are listed examples in which the metaphosphates of a number of bivalent to six valent elements, either alone or in combination with each other and either together with antimony trimetaphosphate or in its place, are added to the glass-forming component mixture in order to furthermore improve glass formation.

Table 7 contains examples of mixtures with constant antimony trimetaphosphate and aluminum fluoride contents. Only the amounts of the alkaline earth metal fluorides were varied, whereby, however, the sum of the alkaline earth metal fluorides remains constant. Thus, for instance, the barium fluoride content of 21.4%, by weight, is increased in each example by 2.0%, by weight, up to a total barium fluoride content of 33.4%, by weight, while at the same time the calcium fluoride content is decreased successively by the same amount in each example. Due thereto the ratio of the fluorine to phosphorus (F/P) successively decreases from 5.4 to 4.9.

In the examples listed in Tables 8, 9, and 10 there are kept constant the amounts of antimony trimetaphosphate, magnesium fluoride, and aluminum fluoride. Likewise, the total sum of all the fluorides added was kept constant. The amounts of the other fluorides, namely of calcium fluoride, strontium fluoride, and barium fluoride, however, were varied and in some examples cadmium fluoride or, respectively, bismuth fluoride were also added.

The examples given in Tables 11 and 12 increase the scope of variation of the present invention insofar as complex fluorotitanates, preferably potassium titanium hexafluoride and/or barium titanium hexafluoride were added.

The following example illustrates the process of melting the glass-forming components in order to produce the fluorophosphate glasses according to the present invention without, however, being limited thereto.

EXAMPLE:

A well mixed mixture of about 500 g. of the composition of Melt Nos. 1 to 79 as given in Tables 1 to 12 is placed portion by portion into a crucible, preferably a platinum crucible, and each portion is melted therein at a temperature of about 900° C. The temperature of the molten mixture is then increased to about 1100° C. and the melt is refined and homogenized at said temperature for about 15 minutes. Thereupon, the melt is cooled while stirring continuously until the casting temperature of about 620° C. is attained. The melt is then poured into molds, preferably aluminum molds which are preheated to about 400° C. The solidified melt is cooled in said casting molds in a tempering furnace to room temperature within about twelve hours. The temperatures of melting, refining, and homogenizing, cooling and casting the glass component mixture may vary by ± 5%. Of course, the temperature - time program as given hereinabove for carrying out the melting procedure represents merely an example. The melting process can be modified by a person skilled in the art depending on the specific charges of glass components employed.

The glasses according to the present invention are especially useful in apochromatically corrected objectives for microscope and photographic apparatus, especially in telephoto lenses.

Although potassium titanium hexafluoride and barium titanium hexafluoride are the preferred complex titanium fluorides, they can be replaced, at least partly, by other complex titanium fluorides, such as other alkali metal titanium hexafluorides, for instance, sodium titanium hexafluoride, lithium titanium hexafluoride, or other alkaline earth metal titanium hexafluorides, such as calcium titanium hexafluoride, strontium titanium fluoride, or magnesium titanium hexafluoride, or aluminum titanium heptafluoride, in the mixture of glass-forming components.

The corresponding orthophosphates and/or pyrophosphates may also be used to replace part of the metaphosphates provided the phosphorus content of the glass is between about 4.1 and about 8.4%, by weight, and the ratio of fluorine to phosphorus (F/P) is between about 3.7 and about 8.2.

It may be mentioned that additives customarily added in glass technology to the batches of glass component mixtures, for instance, additives for refining of the melt, such as alkali metal meta-arsenates, arsenates, bifluorides, and others can be added to the glass component mixture in amounts not exceeding 3%, by weight, without substantially varying the scope of the present invention. Mixtures containing such additives which are within the scope of the attached claims thus are also comprised by them.

We claim:

1. An optical fluorophosphate glass of a high positive anomalous partial dispersion $\Delta v_e$ within the range of from about +10.0 to about +21.0, a relatively high index of refraction $n_e$ within the range of from about 1.47 to about 1.54 and an Abbe number $v_e$ within the range of from about 84.1 to about 51.0, said glass being composed of the following components in approximate weight percent:

OXIDE COMPONENTS (a):

9% to 20% of phosphorus pentoxide (P$_2$O$_5$)
0% to 4% of cadmium oxide (CdO)
0% to 15% of lead monoxide (PbO)
0% to 14% of antimony trioxide (Sb$_2$O$_3$)
0% to 10% of lanthanum oxide (La$_2$O$_3$)
0% to 3% of germanium dioxide (GeO$_2$)
0% to 6% of titanium dioxide (TiO$_2$)
0% to 7% of niobium pentoxide (Nb$_2$O$_5$)
0% to 7% of molybdenum trioxide (MoO$_3$)
0% to 9% of tungsten trioxide (WO$_3$);

FLUORIDE COMPONENTS (b):

3% to 7% of magnesium fluoride (MgF$_2$)

5% to 19% of calcium fluoride (CaF$_2$)
0% to 11% of strontium fluoride (SrF$_2$)
0% to 34% of barium fluoride (BaF$_2$)
0% to 4% of cadmium fluoride (CdF$_2$)
21% to 23% of aluminum fluoride (AlF$_3$)
0% to 10% of bismuth trifluoride (BiF$_3$);

COMPLEX FLUORIDE COMPONENTS (c):

0% to 6% of potassium hydrogen fluoride (KHF$_2$)
0% to 15% of potassium titanium hexafluoride (K$_2$TiF$_6$)
0% to 24% of barium titanium hexafluoride (BaTiF$_6$);
the calculated phosphorus content of said glass being between about 4.1% and about 8.4%, by weight, the calculated fluorine content thereof being between about 30.8% and about 37.6%, by weight, and the ratio of fluorine to phosphorus (F/P) being between about 3.7 and about 8.2.

2. The optical fluorophosphate glass of claim 1, said glass being composed of the following components in approximate weight percent:

OXIDE COMPONENTS (a):

12% to 20% of phosphorus pentoxide (P$_2$O$_5$)
8% to 14% of antimony trioxide (Sb$_2$O$_3$)

FLUORIDE COMPONENTS (b):

3% to 7% of magnesium fluoride (MgF$_2$)
17% to 19% of calcium fluoride (CaF$_2$)
10% to 11% of strontium fluoride (SrF$_2$)
15% to 23% of barium fluoride (BaF$_2$)
21% to 23% of aluminum fluoride (AlF$_3$);

COMPLEX FLUORIDE COMPONENTS (c):

0% to 6% of potassium hydrogen fluoride (KHF$_2$),
the calculated phosphorus content of said glass being between about 5.3% and about 8.4%, by weight, the calculated fluorine content thereof being between about 31.4% and about 35.7%, by weight, and the ratio of fluorine to phosphorus (F/P) being between about 3.7 and about 6.7.

3. The optical fluorophosphate glass of claim 1, said glass being composed of the following components in approximate weight percent:

OXIDE COMPONENTS (a):

9% to 18% of phosphorus pentoxide (P$_2$O$_5$)
0% to 15% of lead monoxide (PbO)
0% to 10% of antimony trioxide (Sb$_2$O$_3$)
0% to 7% of niobium pentoxide (Nb$_2$O$_5$);

FLUORIDE COMPONENTS (b):

5% to 6% of magnesium fluoride (MgF$_2$)
17% to 18% of calcium fluoride (CaF$_2$)
8% to 9% of strontium fluoride (SrF$_2$)
23% to 24% of barium fluoride (BaF$_2$)
21% to 22% of aluminum fluoride (AlF$_3$),
the calculated phosphorus content of said glass being between about 4.1% and about 7.8%, by weight, the calculated fluorine content thereof being about 33.8%, by weight, and the ratio of fluorine to phosphorus (F/P) being between about 4.3 and about 8.2.

4. The optical fluorophosphate glass of claim 1, said glass being composed of the following components in approximate weight percent:

OXIDE COMPONENTS (a):

13% to 15% of phosphorus pentoxide (P$_2$O$_5$)
0% to 4% of cadmium oxide (CdO)
1% to 10% of antimony trioxide (Sb$_2$O$_3$)
0% to 10% of lanthanum oxide (La$_2$O$_3$);

FLUORIDE COMPONENTS (b):

5% to 6% of magnesium fluoride (MgF$_2$)
17% to 18% of calcium fluoride (CaF$_2$)
8% to 9% of strontium fluoride (SrF$_2$)
23% to 24% of barium fluoride (BaF$_2$)
21% to 22% of aluminum fluoride (AlF$_3$),
the calculated phosphorus content of said glass being between about 6.0% and about 6.3%, by weight, the calculated fluorine content thereof being about 33.8%, by weight, and the ratio of fluorine to phosphorus (F/P) being between about 5.4 and about 5.6.

5. The optical fluorophosphate glass of claim 1, said glass being composed of the following components in approximate weight percent:

OXIDE COMPONENTS (a):

12% to 19% of phosphorus pentoxide (P$_2$O$_5$)
0% to 7% of antimony trioxide (Sb$_2$O$_3$)
0% to 6% of lanthanum oxide (La$_2$O$_3$)
0% to 6% of titanium dioxide (TiO$_2$);

FLUORIDE COMPONENTS (b):

5% to 6% of magnesium fluoride (MgF$_2$)
17% to 18% of calcium fluoride (CaF$_2$)
8% to 9% of strontium fluoride (SrF$_2$)
23% to 24% of barium fluoride (BaF$_2$)
21% to 22% of aluminum fluoride (AlF$_3$),
the calculated phosphorus content of said glass being between about 5.2% and about 8.3%, by weight, the calculated fluorine content thereof being between about 33.8% and about 34.5%, by weight, and the ratio of fluorine to phosphorus (F/P) being between about 4.1 and about 6.5.

6. The optical fluorophosphate glass of claim 1, said glass being composed of the following components in approximate weight percent:

OXIDE COMPONENTS (a):

14% to 19% of phosphorus pentoxide (P$_2$O$_5$)
0% to 7% of antimony trioxide (Sb$_2$O$_3$)
0% to 7% of molybdenum trioxide (MoO$_3$)
0% to 9% of tungsten trioxide (WO$_3$);

FLUORIDE COMPONENTS (b):

5% to 6% of magnesium fluoride (MgF$_2$)
17% to 18% of calcium fluoride (CaF$_2$)
8% to 9% of strontium fluoride (SrF$_2$)
23% to 24% of barium fluoride (BaF$_2$)
21% to 22% of aluminum fluoride (AlF$_3$),
the calculated phosphorus content of said glass being between about 6.5% and about 7.9%, by weight, the calculated fluorine content thereof being about 33.8%, by weight, and the ratio of fluorine to phosphorus (F/P) being between about 4.3 and about 5.2.

7. The optical fluorophosphate glass of claim 1, said glass being composed of the following components in approximate weight percent:

OXIDE COMPONENTS (a):

13% to 16% of phosphorus pentoxide (P$_2$O$_5$)
1% to 3% of cadmium oxide (CdO)
1% to 4% of lead monoxide (PbO)
1% to 3% of antimony trioxide (Sb$_2$O$_3$)
0% to 2% of lanthanum oxide (La$_2$O$_3$)

0% to 2% of germanium dioxide (GeO$_2$)
0% to 1% of titanium dioxide (TiO$_2$)
0.5% to 2% of niobium pentoxide (Nb$_2$O$_5$)
0% to 1% of molybdenum trioxide (MoO$_3$)
0% to 2% of tungsten trioxide (WO$_3$);

FLUORIDE COMPONENTS (b):

5% to 7% of magnesium fluoride (MgF$_2$)
17% to 18% of calcium fluoride (CaF$_2$)
8% to 9% of strontium fluoride (SrF$_2$)
23% to 24% of barium fluoride (BaF$_2$)
21% to 22% of aluminum fluoride (AlF$_3$),
the calculated phosphorus content of said glass being between about 4.5% and about 6.9%, by weight, the calculated fluorine content thereof being about 33.8%, by weight, and the ratio of fluorine to phosphorus (F/P) being between about 4.9 and about 7.5.

8. The optical fluorophosphate glass of claim 1, said glass being composed of the following components in approximate weight percent:

OXIDE COMPONENTS (a):

14% to 15% of phosphorus pentoxide (P$_2$O$_5$)
9% to 10% of antimony trioxide (Sb$_2$O$_3$);

FLUORIDE COMPONENTS (b):

5% to 6% of magnesium fluoride (MgF$_2$)
5% to 18% of calcium fluoride (CaF$_2$)
10% to 11% of strontium fluoride (SrF$_2$)
21% to 34% of barium fluoride (BaF$_2$)
21% to 22% of aluminum fluoride (AlF$_3$),
the calculated phosphorus content of said glass being about 6.3%, by weight, the calculated fluorine content thereof being between about 30.8% and about 33.9%, by weight, and the ratio of fluorine to phosphorus (F/P) being between about 4.9 and about 5.4.

9. The optical fluorophosphate glass of claim 1, said glass being composed of the following components in approximate weight percent:

OXIDE COMPONENTS (a):

14% to 15% of phosphorus pentoxide (P$_2$O$_5$)
9% to 10% of antimony trioxide (Sb$_2$O$_3$);

FLUORIDE COMPONENTS (b):

5% to 6% of magnesium fluoride (MgF$_2$)
15% to 18% of calcium fluoride (CaF$_2$)
0% to 9% of strontium fluoride (SrF$_2$)
19% to 32% of barium fluoride (BaF$_2$)
0% to 4% of cadmium fluoride (CdF$_2$)
21% to 22% of aluminum fluoride (AlF$_3$),
the calculated phosphorus content of said glass being about 6.3%, by weight, the calculated fluorine content thereof being between about 33.1% and about 33.9%, by weight, and the ratio of fluorine to phosphorus (F/P) being between about 5.3 and about 5.4.

10. The optical fluorophosphate glass of claim 1, said glass being composed of the following components in approximate weight percent:

OXIDE COMPONENTS (a):

14% to 15% of phosphorus pentoxide (P$_2$O$_5$)
9% to 10% of antimony trioxide (Sb$_2$O$_3$);

FLUORIDE COMPONENTS (b):

5% to 6% of magnesium fluoride (MgF$_2$)
7% to 18% of calcium fluoride (CaF$_2$)
8% to 9% of strontium fluoride (SrF$_2$)
13% to 24% of barium fluoride (BaF$_2$)
21% to 22% of aluminum fluoride (AlF$_3$)
0% to 10% of bismuth trifluoride (BiF$_3$),
the calculated phosphorus content of said glass being about 6.3%, by weight, the calculated fluorine content thereof being between about 31.3% and about 33.8%, by weight, and the ratio of fluorine to phosphorus (F/P) being between about 4.9 and about 5.4.

11. The optical fluorophosphate glass of claim 1, said glass being composed of the following components in approximate weight percent:

OXIDE COMPONENTS (a):

14% to 15% of phosphorus pentoxide (P$_2$O$_5$)
9% to 10% of antimony trioxide (Sb$_2$O$_3$);

FLUORIDE COMPONENTS:

5% to 6% of magnesium fluoride (MgF$_2$)
11% to 18% of calcium fluoride (CaF$_2$)
0% to 9% of strontium fluoride (SrF$_2$)
23% to 24% of barium fluoride (BaF$_2$)
21% to 22% of aluminum fluoride (AlF$_3$);

COMPLEX FLUORIDE COMPONENTS (c):

0% to 15% of potassium titanium hexafluoride (K$_2$TiF$_6$)
0% to 7% of barium titanium hexafluoride (BaTiF$_6$),
the calculated phosphorus content of said glass being about 6.3%, by weight, the calculated fluorine content thereof being between about 33.8% and about 35.2%, by weight, and the ratio of fluorine to phosphorus (F/P) being between about 5.4 and about 5.6.

12. The optical fluorophosphate glass of claim 1, said glass being composed of the following components in approximate weight percent:

OXIDE COMPONENTS (a):

13% to 14% of phosphorus pentoxide (P$_2$O$_5$)
4% to 5% of lead monoxide (PbO)
3% to 4% of antimony trioxide (Sb$_2$O$_3$)
2% to 3% of niobium pentoxide (Nb$_2$O$_5$);

FLUORIDE COMPONENTS (b):

5% to 6% of magnesium fluoride (MgF$_2$)
17% to 18% of calcium fluoride (CaF$_2$)
8% to 9% of strontium fluoride (SrF$_2$)
0% to 24% of barium fluoride (BaF$_2$)
21% to 22% of aluminum fluoride (AlF$_3$);

COMPLEX FLUORIDE COMPONENT (c):

0% to 24% of barium titanium hexafluoride (BaTIF$_6$),
the calculated phosphorus content of said glass being about 6.2%, by weight, the calculated fluorine content thereof being between about 33.8% and about 37.6%, by weight, and the ratio of fluorine to phosphorus (F/P) being between about 5.5 and about 6.1.

13. In a process of producing an optical fluorophosphate glass having an index of refraction n$_e$ wihout the range from about 1.47 to about 1.54, Abbe number $\nu$ within the range of from about 84.1 to about 51.0, and a high positive anomalous partial dispersion $\Delta \nu_e$ within the range of from about +10.0 to about +21.0, said process comprising the steps of a. melting a mixture essentially consisting of the following glass-forming components, in weight percent:

METAPHOSPHATE COMPONENTS (A):

0% to 9% of cadmium metaphosphate ($Cd(PO_3)_2$)
0% to 25% of lead metaphosphate ($Pb(PO_3)_2$)
0% to 33% of antimony trimetaphosphate ($Sb(PO_3)_3$)
0% to 22% of lanthanum metaphosphate ($La(PO_3)_3$)
0% to 5% of germanium tetrametaphosphate ($Ge(PO_3)_4$)
0% to 25% of titanium tetrametaphosphate ($Ti(PO_3)_4$)
0% to 25% of niobium pentametaphosphate ($Nb(PO_3)_5$)
0% to 25% of molybdenum hexametaphosphate ($Mo(PO_3)_6$)
0% to 25% of tungsten hexametaphosphate ($W(PO_3)_6$)
0% to 9% of lanthanum orthophosphate ($LaPO_4$);

FLUORIDE COMPONENTS (B):

3% to 7% of magnesium fluoride ($MgF_2$)
5% to 19% of calcium fluoride ($CaF_2$)
0% to 11% of strontium fluoride ($SrF_2$)
0% to 34% of barium fluoride ($BaF_2$)
0% to 4% of cadmium fluoride ($CdF_2$)
21% to 23% of aluminum fluoride ($AlF_3$)
0% to 10% of bismuth trifluoride ($BiF_3$);

COMPLEX FLUORIDE COMPONENTS (C):

0% to 6% of potassium hydrogen fluoride ($KHF_2$)
0% to 15% of potassium titanium hexafluoride ($K_2TiF_6$)
0% to 24% of barium titanium hexafluoride ($BaTiF_6$),
the total sum of the alkaline earth metal fluorides in said mixture being between about 40% and about 58%, the total sum of all fluorides in said mixture being between about 67% and about 80%, and the total sum of the metaphosphates being between about 16% and about 33%, b. homogenizing the molten mixture,
c. cooling said resulting homogenized melt, and
d. pouring the cooled melt into preheated molds.

14. The process of claim 13, in which
the mixture of glass-forming components is molten in step (a) at a temperature between about 875° and about 930° C.;
the molten mixture is homogenized in step (b) at a temperature between about 1050° and about 1180° C. within a period of time between about 10 minutes and about 25 minutes;
the resulting homogenized melt is cooled in step (c) to a temperature between about 600° and about 645° C. while continuing stirring; and
the cooled melt is poured in step (d) into preheated molds.

15. The process of claim 13, in which the mixture to be melted consists of the following glass-forming components in weight percent:

METAPHOSPHATE COMPONENT (A):

20% to 33% of antimony trimetaphosphate ($Sb(PO_3)_3$)

FLUORIDE COMPONENTS (B):

3% to 7% of magnesium fluoride ($MgF_2$)
17% to 19% of calcium fluoride ($CaF_2$)
10% to 11% of strontium fluoride ($SrF_2$)
15% to 23% of barium fluoride ($BaF_2$)
21% to 23% of aluminum fluoride ($AlF_3$);

COMPLEX FLUORIDE COMPONENT (C):

0% to 6% of potassium hydrogen fluoride ($KHF_2$);
the sum total of the alkaline earth metal fluorides in said mixture being between about 46% and about 58%, by weight, and the sum total of all fluorides being between about 67% and about 80%, by weight.

16. The process of claim 13, in which the mixture to be melted consists of the following glass-forming components, in weight percent:

METAPHOSPHATE COMPONENTS (A):

0% to 16% of antimony trimetaphosphate ($Sb(PO_3)_3$)
0% to 24.4% of tetrametaphosphate ($Ti(PO_3)_4$)
0% to 9% of lanthanum orthophosphate ($LaPO_4$);

FLUORIDE COMPONENTS (B):

5% to 6% of magnesium fluoride ($MgF_2$)
17% to 18% of calcium fluoride ($CaF_2$)
8% to 9% of strontium fluoride ($SrF_2$)
23% to 24% of barium fluoride ($BaF_2$)
21% to 22% of aluminum fluroride ($AlF_3$),
the sum total of the alkaline earth metal fluorides in said mixture being between about 54.6% and about 55.9%, by weight, the sum of all flourides being between about 75.6% and about 77.4%, by weight, and the sum total of the metaphosphates being between about 16.0% and about 24.4%, by weight.

17. A batch composition for producing a fluorophosphate glass having an index of refraction $n_e$ within the range of from about 1.47 to about 1.54, an Abbe number $\nu_e$ within the range of from about 84.1 to about 51.0, and a high positive anomalous partial dispersion $\Delta \nu_e$ within the range of from about +10.0 to about +21.0, said composition essentially consisting of the following glass-forming comonents, in weight percent.

METAPHOSPHATE COMPONENTS (A):

0% to 9% of cadmium metaphosphate ($Cd(PO_3)_2$)
0% to 25% of lead metaphosphate ($Pb(PO_3)_2$)
0% to 33% of antimony trimetaphosphate ($Sb(PO_3)_3$)
0% to 22% of lanthanum metaphosphate ($La(PO_3)_3$)
0% to 5% of germanium tetrametaphosphate ($Ge(PO_3)_4$)
0% to 25% of titaniumm tetrametaphosphate ($Ti(PO_3)_4$)
0% to 25% of niobium pentametaphosphate ($Nb(PO_3)_5$)
0% to 25% of molybdenum hexametaphosphate ($Mo(PO_3)_6$)
0% to 25% of tungsten hexametaphosphate ($W(PO_3)_6$)
0% to 9% of lanthanum orthophosphate ($LaPO_4$);

FLUORIDE COMPONENTS (B):

3% to 7% of magnesium fluoride ($MgF_2$)
5% to 19% of calcium fluoride ($CaF_2$)
0% to 11% of strontium fluoride ($SrF_2$)
0% to 34% of barium fluoride ($BaF_2$)
0% to 4% of cadmium fluoride ($CdF_2$)
21% to 23% of aluminum fluoride ($AlF_3$)
0% to 10% of bismuth trifluoride ($BiF_3$)

COMPLEX FLUORIDE COMPONENTS (C):

0% to 6% of potassium hydrogen fluoride ($KHF_2$)
0% to 15% of potassium titanium hexafluoride ($K_2TiF_6$)
0% to 24% of barium titanium hexafluoride ($BaTiF_6$), the sum total of the alkaline earth metal fluorides in said mixture being between about 40.0% and about 58.0%, the sum total of all fluorides being between about 67.0% and about 80.0%, and the sum total of the metaphosphates being between about 16.0% and about 33.0%.

18. The batch composition of claim 17, in which the potassium titanium hexafluoride is at least partly replaced by another alkali metal titanium hexafluoride and the barium titanium hexafluoride is at least partly replaced by another alkaline earth metal titanium hexafluoride or aluminum titanium heptafluoride.

19. The optical fluorophosphate glass of claim 1, in which the following components are present in about the following amounts, in weight percent:

| Oxide components (a): | |
|---|---|
| Phosphorus pentoxide ($P_2O_5$) | 14.5% |
| Antimony trioxide ($Sb_2O_3$) | 9.9% |
| Fluoride components (b): | |
| Magnesium fluoride ($MgF_2$) | 5.7% |
| Strontium fluoride ($SrF_2$) | 10.2% |
| Aluminum fluoride ($AlF_3$) | 21.0%, | while calcium fluoride ($CaF_2$) and barium fluoride ($BaF_2$) are present in amounts sufficient to make up 100%.

20. The optical fluorophosphate glass of claim 1, in which the following components are present in about the following amounts, in weight percent:

| Oxide components (a): | |
|---|---|
| Phosphorus pentoxide ($P_2O_5$) | 14.5% |
| Antimony trioxide ($Sb_2O_3$) | 9.9% |
| Fluoride components (b): | |
| Magnesium fluoride ($MgF_2$) | 5.7% |
| Aluminum fluoride ($AlF_3$) | 21.0% | while calcium fluoride ($CaF_2$), strontium fluoride ($SrF_2$), barium fluoride ($BaF_2$), and cadmium fluoride ($CdF_2$) are present in amounts sufficient to make up 100%.

21. The optical fluorophosphate glass of claim 1, in which the following components are present in about the following amounts, in weight percent:

| Oxide components (a): | |
|---|---|
| Phosphorus pentoxide ($P_2O_5$) | 14.5% |
| Antimony trioxide ($Sb_2O_3$) | 9.9% |
| Fluoride components (b): | |
| Magnesium fluoride ($MgF_2$) | 5.7% |
| Strontium fluoride ($SrF_2$) | 8.2% |
| Barium fluoride ($BaF_2$) | 23.4% |
| Aluminum fluoride ($AlF_3$) | 21.0%, | while calcium fluoride ($CaF_2$) and bismuth trifluoride ($BiF_3$) are present in amounts sufficient to make up 100%.

22. The optical fluorophosphate glass of claim 1, in which the following components are present in about the following amounts, in weight percent:

| Oxide components (a): | |
|---|---|
| Phosphorus pentoxide ($P_2O_5$) | 14.5% |
| Antimony trioxide ($Sb_2O_3$) | 9.9% |
| Fluoride components (b): | |
| Magnesium fluoride ($MgF_2$) | 5.7% |
| Calcium fluoride $CaF_2$) | 17.3% |
| Strontium fluoride ($SrF_2$) | 8.2% |
| Aluminum fluoride ($AlF_3$) | 21.0%, | while barium fluoride ($BaF_3$) and bismuth trifluoride ($BiF_3$) are present in amounts sufficient to make up 100%.

23. The optical fluorophosphate glass of claim 1, in which the following components are present in about the following amounts, in weight percent:

| Oxide components (a): | |
|---|---|
| Phosphorus pentoxide ($P_2O_5$) | 14.5% |
| Antimony trioxide ($Sb_2O_3$) | 9.9% |
| Fluoride components (b): | |
| Magnesium fluoride ($MgF_2$) | 5.7% |
| Barium fluoride ($BaF_2$) | 23.4% |
| Aluminum fluoride ($AlF_3$) | 21.0%, | while calcium fluoride ($CaF_2$), strontium fluoride ($SrF_2$), and the complex titanium hexafluorides are present in amountssufficient to make up 100%.

24. The optical fluorophosphate glass of claim 1, in which the following components are present in about the following amounts, in weight percent:

| Oxide component (a): | |
|---|---|
| Phosphorus pentoxide ($P_2O_5$) | 13.9% |
| Antimony trioxide ($Sb_2O_3$) | 3.3% |
| Lead Monoxide (PbO) | 4.9% |
| Niobium pentoxide ($Nb_2O_5$) | 2.3% |
| Fluoride components (b): | |
| Magnesium fluoride ($MgF_2$) | 5.7% |
| Calcium fluoride ($CaF_2$) | 17.3% |
| Strontium fluoride ($SrF_2$) | 8.2% |
| Aluminum fluoride ($AlF_3$) | 21.0%, | while barium fluoride ($BaF_2$) and the complex titanium hexafluorides are present in amounts sufficient to make up 100%.

* * * * *

UNITED STATES PATENT OFFICE
CERTIFICATE OF CORRECTION

Patent No. 4,040,846          Dated  August 9, 1977

Inventor(s) Heinz Broemer, et al

It is certified that error appears in the above-identified patent and that said Letters Patent are hereby corrected as shown below:

The Cover Sheet and Columns 9 thru 20 should be deleted and substituted with the attached Cover Sheet and Columns, respectively.

Column 4, line 59, "fluroide" should read --fluoride--.

Column 21, line 22, "six valent" should read --sixvalent--;
           line 49, "fluoride" should read --trifluoride--.

Column 22, line 26, "fluoride" should read --hexafluoride--.

Column 26, line 53, "(BaTiF$_6$)" should read --(BaTiF$_6$);
           line 60, "without" should read --within--;
           line 61, before "Abbe" insert --an--; and " $\nu$ " should read --$\nu_e$--.

Column 27, line 25 "(AlF$_3$)" should read --(AlF$_3$);
           line 39, "homogenzing" should read --homogenizing--;
           line 68, (AlF$_3$)" should read --(AlF$_3$)--.

Column 28, line 14, "tetrametaphosphate" should read --titanium metaphosphate--;

UNITED STATES PATENT OFFICE
CERTIFICATE OF CORRECTION

Patent No. 4,040,846            Dated August 9, 1977

Inventor(s) Heinz Broemer, et al

It is certified that error appears in the above-identified patent and that said Letters Patent are hereby corrected as shown below:

Column 28, line 22, "fluroride ($AlF_3$)" should read --fluoride ($AlF_3$)--;

line 36, "comonents" should read --components--;

line 61, "($AlF_3$)" should read --($AlF_3$)--.

Column 29, line 37, "Fluoride components (b):" should be underlined.

Column 30, line 20, "($BaF_3$)" should read --($BaF_2$)--;

line 44, "Lead Monoxide (PbO)" should read --Lead Monoxide (PbO)--.

Signed and Sealed this

Twenty-first Day of March 1978

[SEAL]

Attest:

RUTH C. MASON  
*Attesting Officer*

LUTRELLE F. PARKER  
*Acting Commissioner of Patents and Trademarks*

United States Patent [19]

Broemer et al.

[11] 4,040,846
[45] Aug. 9, 1977

[54] OPTICAL FLUOROPHOSPHATE GLASS AND PROCESS OF MAKING SAME

[75] Inventors: Heinz Broemer, Hermannstein; Norbert Meinert, Bielhausen, both of Germany

[73] Assignee: Ernst Leitz G.m.b.H., Wetzlar, Germany

[21] Appl. No.: 667,836

[22] Filed: Mar. 17, 1976

[30] Foreign Application Priority Data

Mar. 29, 1975 Germany .................. 2514017

[51] Int. Cl.² .................. C03C 3/16; C03C 3/18
[52] U.S. Cl. .................. 106/47 Q
[58] Field of Search .............. 106/47 Q, 47 R; 65/134

[56] References Cited

U.S. PATENT DOCUMENTS

| | | | |
|---|---|---|---|
| 2,901,363 | 8/1959 | Pincus | 106/47 Q |
| 2,919,201 | 12/1959 | Izumitani | 106/47 Q |
| 2,996,391 | 8/1961 | Weissenberg | 106/47 Q |
| 3,068,108 | 12/1962 | Geffcken | 106/47 Q |
| 3,492,136 | 1/1970 | Broemer | 106/47 Q |
| 3,508,937 | 4/1970 | Broemer | 106/47 Q |
| 3,597,245 | 8/1971 | Broemer | 106/47 Q |
| 3,656,976 | 4/1972 | Izumitani | 106/47 Q |
| 3,671,276 | 6/1972 | Bromer | 106/47 Q |
| 3,847,624 | 11/1974 | Broemer | 106/47 Q |
| 3,954,484 | 5/1976 | Broemer et al. | 106/47 Q |

Primary Examiner—Winston A. Douglas
Assistant Examiner—Mark Bell
Attorney, Agent, or Firm—Erich M. H. Radde

[57] ABSTRACT

A fluorophosphate glass of a high positive anomalous partial dispersion $\Delta v_e$ within the range of from about +10.0 to about +21.0, a relatively high index of refraction $n_e$ within the range of from about 1.47 to about 1.54, and an Abbe number $v_e$ within the range of from about 84.1 to about 51.0 is provided. A simple process of melting such a glass is disclosed.

24 Claims, 2 Drawing Figures

0% to 4% of lanthanum metaphosphate (La(PO$_3$)$_3$),
0% to 5% of germanium tetrametaphosphate (Ge(PO$_3$)$_4$),
0% to 4% of titanium tetrametaphosphate (Ti(PO$_3$)$_4$),
2% to 7% of niobium pentametaphosphate (Nb(PO$_3$)$_5$),
0% to 3% of molybdenum hexametaphosphate (Mo(PO$_3$)$_6$),
0% to 3% of tungsten hexametaphosphate (W(PO$_3$)$_6$);

COMPONENT (b):

5% to 6% of magnesium fluoride (MgF$_2$),
17% to 18% of calcium fluoride (CaF$_2$),
8% to 9% of strontium fluoride (SrF$_2$),
23% to 24% of barium fluoride (BaF$_2$),
21% to 22% of aluminum fluoride (AlF$_3$).

The alkaline earth metal fluoride content of this mixture is 54.6%, by weight, while the sum of all fluorides is 75.6%, by weight, and the sum of the metaphosphates is 25%, by weight.

GLASS G:

COMPONENT (a):

24% to 25% of antimony trimetaphosphate (Sb(PO$_3$)$_3$);

COMPONENT (b):

5% to 6% of magnesium fluoride (MgF$_2$),
5% to 18% of calcium fluoride (CaF$_2$),
10% to 11% of strontium fluoride (SrF$_2$),
21% to 34% of barium fluoride (BaF$_2$),
21% to 22% of aluminum flouride (AlF$_3$).

The alkaline earth metal fluoride content of this mixture is 54.6%, by weight, and the sum of all fluorides is 75.6%, by weight.

GLASS H:

COMPONENT (a):

245 to 25% of antimony trimetaphosphate (Sb(PO$_3$)$_3$);

COMPONENT (b):

5% to 6% of magnesium fluoride (MgF$_2$),
15% to 18% of calcium fluoride (CaF$_2$),
0% to 9% of strontium fluoride (SrF$_2$),
19% to 32% of barium fluoride (BaF$_2$),
0% to 4% of cadmium fluoride (CdF$_2$),
21% to 22% of aluminum fluoride (AlF$_3$).

The alkaline earth metal fluoride content of this mixture is between 50.6% and 54.6%, by weight, while the sum of all fluorides is 75.6%, by weight.

GLASS I:

COMPONENT (a):

24% of antimony trimetaphosphate (Sb(PO$_3$)$_3$);

COMPONENT (b):

5% to 6% of magnesium fluoride (MgF$_2$),
7% to 18% of calcium fluoride (CaF$_2$),
8% to 9% of strontium fluoride (SrF$_2$),
13% to 24% of barium fluoride (BaF$_2$),
21% to 22% of aluminum fluoride (AlF$_3$),
0% to 10% of bismuth trifluoride (BiF$_3$).

The alkaline earth metal fluoride content of this mixture is between 44.6% and 54.6%, by weight, while the sum of all fluorides is 75.6%, by weight.

GLASS J:

COMPONENT (a):

24% to 25% of antimony trimetaphosphate (Sb(PO$_3$)$_3$);

COMPONENT (b):

5% to 6% of magnesium fluoride (MgF$_2$),
11% to 18% of calcium fluoride (CaF$_2$),
0% to 9% of strontium fluoride (SrF$_2$),
23% to 24% of barium fluoride (BaF$_2$),
21% to 22% of aluminum fluoride (AlF$_3$);

COMPONENT (c):

0% to 15% of potassium titanium hexafluoride (K$_2$TiF$_6$),
0% to 7% of barium titanium hexafluoride (BaTiF$_6$).

The alkaline earth metal fluoride content of this mixture is between 40.1% and 54.6%, by weight, while the sum of all fluorides if 75.6%, by weight.

GLASS K:

COMPONENT (a):

8% to 9% of lead metaphosphate (Pb(PO$_3$)$_2$),
8% to 9% of antimony trimetaphosphate (Sb(PO$_3$)$_3$),
8% to 9% of niobium pentametaphosphate (Nb(PO$_3$)$_5$);

COMPONENT (b):

5% to 6% of magnesium fluoride (MgF$_2$),
17% to 18% of calcium fluoride (CaF$_2$),
8% to 9% of strontium fluoride (SrF$_2$),
0% to 24% of barium fluoride (BaF$_2$),
21% to 22% of aluminum fluoride (AlF$_3$);

COMPONENT (c):

0% to 24% of barium titanium hexafluoride (BaTiF$_6$).

The alkaline earth metal fluoride content of this mixture is 54.6%, by weight, while the sum of all fluorides is 75.6%, by weight, and the sum of the metaphosphates is 24.4%, by weight.

The optical fluorophosphate glasses according to the present invention can be produced in the highly advantageous manner that their melts can be cooled and stirred to relatively low temperatures. Thus, casting of the melt into the mold can be carried out even at relatively high viscosity values of the melt. Only when proceeding in this manner, it is possible to satisfactorily homogenize the melt before it is poured into molds.

The glasses according to the present invention have the further advantage that they can be molten in relatively large charges and that surprisingly they do not show any partial differences in their indices of refraction. Furthermore, the glasses are highly stable and do not tend to crystallize.

BRIEF DESCRIPTION OF THE DRAWINGS

In the accompanying drawings the particular optical parameters of glasses produced according to the present invention are shown. In said drawings FIG. 1 shows the optical position range of the glasses according to the present invention in an $n_e$-$\nu_e$ diagram as compared with known glasses and FIG. 2 shows the optical position range of the glasses according to the present invention in a $\vartheta'_g \nu_e$ system of coordinates.

DESCRIPTION OF THE PREFERRED EMBODIMENTS

Fluorophosphate glasses according to the present invention are produced, for instance, by melting mixtures composed as listed in the following Tables 1 to 12 in which the amounts of glass-forming agents are given in weight percent.

TABLE 1

| Melt No. | 1 | 2 | 3 | 4 | 5 |
|---|---|---|---|---|---|
| $Sb(PO_3)_3$ | 24.4 | 26.4 | 30.4 | 22.4 | 20.4 |
| $MgF_2$ | 5.7 | 5.7 | 5.7 | 5.7 | 6.1 |
| $CaF_2$ | 17.3 | 17.3 | 17.3 | 17.7 | 18.1 |
| $SrF_2$ | 10.2 | 10.2 | 10.2 | 10.5 | 10.6 |
| $BaF_2$ | 15.4 | 15.4 | 15.4 | 22.1 | 22.6 |
| $AlF_3$ | 21.0 | 21.0 | 21.0 | 21.6 | 22.2 |
| $KHF_2$ | 6.0 | 4.0 | — | — | — |
| $\Sigma Me^x(PO_3)_x$ | 24.4 | 26.4 | 30.4 | 22.4 | 20.4 |
| $\Sigma$(fluorides) | 75.6 | 73.6 | 69.6 | 77.6 | 79.6 |
| $\Sigma$(alkaline earth metal fluorides) | 48.6 | 48.6 | 48.6 | 56.0 | 57.4 |
| $P_2O_5$ | 14.5 | 15.7 | 18.0 | 13.3 | 12.1 |
| $Sb_2O_3$ | 9.9 | 10.7 | 12.4 | 9.1 | 8.3 |
| P | 6.3 | 6.9 | 7.9 | 5.8 | 5.5 |
| F | 35.5 | 34.5 | 32.6 | 34.8 | 35.7 |
| F/P | 5.6 | 5.0 | 4.1 | 6.0 | 6.7 |
| $n_e$ | 1.4725 | 1.4794 | 1.4995 | 1.4815 | 1.4759 |
| $\nu_e$ | 82.2 | 80.3 | 78.4 | 82.8 | 84.1 |
| $\vartheta'_g$ | 0.4784 | 0.4736 | 0.4711 | 0.4793 | 0.4751 |
| $+\Delta\nu_e$ | 19.9 | 14.6 | 10.9 | 17.3 | 19.6 |

| Melt No. | 6 | 7 | 40 | 41 |
|---|---|---|---|---|
| $Sb(PO_3)_3$ | 32.4 | 24.4 | 24.4 | 24.4 |
| $MgF_2$ | 3.7 | 5.7 | 5.7 | 5.7 |
| $CaF_2$ | 17.3 | 17.3 | 17.3 | 17.3 |
| $SrF_2$ | 10.2 | 8.2 | 10.2 | 10.2 |
| $BaF_2$ | 15.4 | 23.4 | 17.4 | 19.4 |
| $AlF_3$ | 21.0 | 21.0 | 21.0 | 21.0 |
| $KHF_2$ | — | — | 4.0 | 2.0 |
| $\Sigma Me^x(PO_3)_x$ | 32.4 | 24.4 | 24.4 | 24.4 |
| $\Sigma$(fluorides) | 67.6 | 75.6 | 75.6 | 75.6 |
| $\Sigma$(alkaline earth metal fluorides) | 46.6 | 54.6 | 50.6 | 52.6 |
| $P_2O_5$ | 19.2 | 14.5 | 14.5 | 14.5 |
| $Sb_2O_3$ | 13.2 | 9.9 | 9.9 | 9.9 |
| P | 8.4 | 6.3 | 6.3 | 6.3 |
| F | 31.4 | 33.8 | 35.0 | 34.5 |
| F/P | 3.7 | 5.4 | 5.6 | 5.5 |
| $n_e$ | 1.5083 | 1.4779 | 1.4722 | 1.4806 |
| $\nu_e$ | 76.4 | 83.0 | 82.4 | 81.8 |
| $\vartheta'_g$ | 0.4726 | 0.4785 | 0.4710 | 0.4736 |
| $+\Delta\nu_e$ | 10.0 | 20.7 | 14.9 | 16.0 |

TABLE 2

| Melt No. | 8 | 9 | 10 | 11 | 12 | 13 | 14 |
|---|---|---|---|---|---|---|---|
| $Sb(PO_3)_3$ | 16.0 | 8.0 | — | 16.0 | 8.0 | — | 8.0 |
| $Pb(PO_3)_2$ | 8.4 | 16.4 | 24.4 | — | — | — | 8.0 |
| $Nb(PO_3)_5$ | — | — | — | 8.4 | 16.4 | 24.4 | 8.4 |
| $MgF_2$ | 5.7 | 5.7 | 5.7 | 5.7 | 5.7 | 5.7 | 5.7 |
| $CaF_2$ | 17.3 | 17.3 | 17.3 | 17.3 | 17.3 | 17.3 | 17.3 |
| $SrF_2$ | 8.2 | 8.2 | 8.2 | 8.2 | 8.2 | 8.2 | 8.2 |
| $BaF_2$ | 23.4 | 23.4 | 23.4 | 23.4 | 23.4 | 23.4 | 23.4 |
| $AlF_3$ | 21.0 | 21.0 | 21.0 | 21.0 | 21.0 | 21.0 | 21.0 |
| $\Sigma Me^x(PO_3)_x$ | 24.4 | 24.4 | 24.4 | 24.4 | 24.4 | 24.4 | 24.4 |
| $\Sigma$(fluorides) | 75.6 | 75.6 | 75.6 | 75.6 | 75.6 | 75.6 | 75.6 |
| $\Sigma$(alkaline earth metal fluorides) | 54.6 | 54.6 | 54.6 | 54.6 | 54.6 | 54.6 | 54.6 |
| $P_2O_5$ | 12.8 | 11.1 | 9.5 | 15.6 | 16.6 | 17.8 | 13.9 |
| $Sb_2O_3$ | 6.5 | 3.3 | — | 6.5 | 3.3 | — | 3.3 |
| PbO | 5.1 | 10.0 | 14.9 | — | — | — | 4.9 |
| $Nb_2O_5$ | — | — | — | 2.3 | 4.5 | 6.6 | 2.3 |
| P | 5.5 | 4.9 | 4.1 | 6.8 | 7.3 | 7.8 | 6.2 |
| F | 33.8 | 33.8 | 33.8 | 33.8 | 33.8 | 33.8 | 33.8 |
| F/P | 6.1 | 6.9 | 8.2 | 5.0 | 4.6 | 4.3 | 5.5 |
| $n_e$ | 1.4966 | 1.5001 | 1,5089 | 1.4963 | 1.5024 | 1.5099 | 1.5062 |
| $\nu_e$ | 75.5 | 72.2 | 68.6 | 74.4 | 69.4 | 65.1 | 70.4 |
| $\vartheta'_g$ | 0.4830 | 0.4820 | 0.4908 | 0.4813 | 0.4901 | 0.4913 | 0.4891 |
| $+\Delta\nu_e$ | 16.1 | 12.4 | 14.4 | 14.1 | 15.3 | 11.7 | 15.6 |

TABLE 3

| Melt No. | 7 | 15 | 16 | 17 | 18 |
|---|---|---|---|---|---|
| $Sb(PO_3)_3$ | 24.4 | 16.0 | 16.0 | 8.0 | 2.4 |
| $Cd(PO_3)_2$ | — | 8.4 | — | — | — |
| $La(PO_3)_3$ | — | — | 8.4 | 16.4 | 22.0 |
| $MgF_2$ | 5.7 | 5.7 | 5.7 | 5.7 | 5.7 |
| $CaF_2$ | 17.3 | 17.3 | 17.3 | 17.3 | 17.3 |
| $SrF_2$ | 8.2 | 8.2 | 8.2 | 8.2 | 8.2 |
| $BaF_2$ | 23.4 | 23.4 | 23.4 | 23.4 | 23.4 |
| $AlF_3$ | 21.0 | 21.0 | 21.0 | 21.0 | 21.0 |
| $\Sigma Me^x(PO_3)_x$ | 24.4 | 24.4 | 24.4 | 24.4 | 24.4 |
| $\Sigma$(fluorides) | 75.6 | 75.6 | 75.6 | 75.6 | 75.6 |
| $\Sigma$(alkaline earth metal fluorides) | 54.6 | 54.6 | 54.6 | 54.6 | 54.6 |
| $P_2O_5$ | 14.5 | 13.9 | 14.3 | 14.0 | 13.5 |
| $Sb_2O_3$ | 9.9 | 6.5 | 6.5 | 3.3 | 1.0 |
| CdO | — | 4.0 | — | — | — |
| $La_2O_3$ | — | — | 3.6 | 7.1 | 9.9 |
| P | 6.3 | 6.0 | 6.2 | 6.2 | 6.0 |
| F | 33.8 | 33.8 | 33.8 | 33.8 | 33.8 |
| F/P | 5.4 | 5.6 | 5.5 | 5.5 | 5.6 |
| $n_e$ | 1.4779 | 1.4888 | 1.4861 | 1.4920 | 1.4942 |
| $\nu_e$ | 83.0 | 80.0 | 82.2 | 81.5 | 81.0 |
| $\vartheta'_g$ | 0.4785 | 0.4815 | 0.4768 | 0.4805 | 0.4756 |
| $+\Delta\nu_e$ | 20.7 | 19.8 | 18.7 | 20.6 | 16.6 |

TABLE 4

| Melt No. | 19 | 20 | 21 | 22 | 23 | 24 |
|---|---|---|---|---|---|---|
| $Sb(PO_3)_3$ | 16.0 | 8.0 | — | — | — | 16.0 |
| $Ti(PO_3)_4$ | 8.4 | 16.4 | 24.4 | 22.6 | 23.3 | — |
| $LaPO_4$ | — | — | — | — | — | 8.4 |
| $MgF_2$ | 5.7 | 5.7 | 5.7 | 5.8 | 5.8 | 5.7 |
| $CaF_2$ | 17.3 | 17.3 | 17.3 | 17.7 | 17.6 | 17.3 |
| $SrF_2$ | 8.2 | 8.2 | 8.2 | 8.4 | 8.3 | 8.2 |
| $BaF_2$ | 23.4 | 23.4 | 23.4 | 24.0 | 23.7 | 23.4 |
| $AlF_3$ | 21.0 | 21.0 | 21.0 | 21.5 | 21.3 | 21.0 |
| $\Sigma Me^x(PO_3)_x$ | 24.4 | 24.4 | 24.4 | 22.6 | 23.3 | 16.0 |
| $\Sigma$(fluorides) | 75.6 | 75.6 | 75.6 | 77.4 | 76.7 | 75.6 |
| $\Sigma$(alkaline earth metal fluorides) | 54.6 | 54.6 | 54.6 | 55.9 | 55.4 | 54.6 |
| $P_2O_5$ | 16.1 | 17.5 | 19.0 | 17.6 | 18.2 | 12.0 |
| $Sb_2O_3$ | 6.5 | 3.3 | — | — | — | 6.5 |
| $TiO_2$ | 1.8 | 3.6 | 5.4 | 5.0 | 5.1 | — |
| $La_2O_3$ | — | — | — | — | — | 5.9 |
| P | 7.0 | 7.7 | 8.3 | 7.7 | 7.9 | 5.2 |
| F | 33.8 | 33.8 | 33.8 | 34.5 | 34.4 | 33.8 |
| F/P | 4.8 | 4.4 | 4.1 | 4.5 | 4.4 | 6.5 |
| $n_e$ | 1.4987 | 1.5094 | 1.5223 | 1.5149 | 1.5186 | 1.4858 |
| $\nu_e$ | 71.7 | 62.8 | 56.8 | 60.2 | 58.7 | 82.5 |
| $\vartheta'_g$ | 0.4882 | 0.5000 | 0.5102 | 0.5029 | 0.5051 | 0.4799 |
| $+\Delta\nu_e$ | 16.2 | 15.6 | 16.8 | 15.1 | 15.1 | 20.2 |

TABLE 5

| Melt No. | 25 | 26 | 27 | 28 | 29 | 30 |
|---|---|---|---|---|---|---|
| $Sb(PO_3)_3$ | 16.0 | 8.0 | — | 16.0 | 8.0 | — |
| $Mo(PO_3)_6$ | 8.4 | 16.4 | 24.4 | — | — | — |
| $W(PO_3)_6$ | — | — | — | 8.4 | 16.4 | 24.4 |
| $MgF_2$ | 5.7 | 5.7 | 5.7 | 5.7 | 5.7 | 5.7 |
| $CaF_2$ | 17.3 | 17.3 | 17.3 | 17.3 | 17.3 | 17.3 |
| $SrF_2$ | 8.2 | 8.2 | 8.2 | 8.2 | 8.2 | 8.2 |
| $BaF_2$ | 23.4 | 23.4 | 23.4 | 23.4 | 23.4 | 23.4 |
| $AlF_3$ | 21.0 | 21.0 | 21.0 | 21.0 | 21.0 | 21.0 |
| $\Sigma Me^x(PO_3)_x$ | 24.4 | 24.4 | 24.4 | 24.4 | 24.4 | 24.4 |
| $\Sigma$(fluorides) | 75.6 | 75.6 | 75.5 | 75.6 | 75.6 | 75.6 |
| $\Sigma$(alkaline earth metal fluorides) | 54.6 | 54.6 | 54.6 | 54.6 | 54.6 | 54.6 |
| $P_2O_5$ | 15.8 | 17.0 | 18.2 | 14.9 | 15.3 | 15.8 |
| $Sb_2O_3$ | 6.5 | 3.3 | — | 6.5 | 3.3 | — |
| $MoO_3$ | 2.1 | 4.1 | 6.2 | — | — | — |
| $WO_3$ | — | — | — | 3.0 | 5.8 | 8.6 |
| P | 6.8 | 7.5 | 7.9 | 6.5 | 6.7 | 6.9 |
| F | 33.8 | 33.8 | 33.8 | 33.8 | 33.8 | 33.8 |
| F/P | 5.0 | 4.5 | 4.3 | 5.2 | 5.0 | 4.9 |
| $n_e$ | 1.4862 | 1.4913 | 1.4932 | 1.4877 | 1.4924 | 1.4994 |
| $\nu_e$ | 80.5 | 79.2 | 78.0 | 77.3 | 75.1 | 71.6 |
| $\vartheta'_g$ | 0.4800 | 0.4795 | 0.4792 | 0.4799 | 0.4813 | 0.4877 |
| $+\Delta\nu_e$ | 19.3 | 17.6 | 16.1 | 15.9 | 14.8 | 15.7 |

TABLE 6

| Melt No. | 31 | 32 | 33 | 34 | 35 | 36 |
|---|---|---|---|---|---|---|
| $Sb(PO_3)_3$ | 6.0 | 5.0 | 4.4 | 3.5 | 3.0 | 2.7 |
| $Pb(PO_3)_2$ | 6.0 | 5.0 | 4.0 | 3.5 | 3.0 | 2.7 |
| $Cd(PO_3)_2$ | 6.0 | 5.0 | 4.0 | 3.5 | 3.0 | 2.7 |
| $La(PO_3)_3$ | — | — | — | 3.4 | 3.4 | 2.8 |
| $Ge(PO_3)_4$ | — | 4.4 | 4.0 | 3.5 | 3.0 | 2.7 |
| $Ti(PO_3)_4$ | — | — | 4.0 | 3.5 | 3.0 | 2.7 |
| $Nb(PO_3)_5$ | 6.4 | 5.0 | 4.0 | 3.5 | 3.0 | 2.7 |
| $W(PO_3)_6$ | — | — | — | — | 3.0 | 2.7 |
| $Mo(PO_3)_6$ | — | — | — | — | — | 2.7 |
| $MgF_2$ | 5.7 | 5.7 | 5.7 | 5.7 | 5.7 | 5.7 |
| $CaF_2$ | 17.3 | 17.3 | 17.3 | 17.3 | 17.3 | 17.3 |
| $SrF_2$ | 8.2 | 8.2 | 8.2 | 8.2 | 8.2 | 8.2 |
| $BaF_2$ | 23.4 | 23.4 | 23.4 | 23.4 | 23.4 | 23.4 |
| $AlF_3$ | 21.0 | 21.0 | 21.0 | 21.0 | 21.0 | 21.0 |
| $\Sigma Me^x(PO_3)_x$ | 24.4 | 24.4 | 24.4 | 24.4 | 24.4 | 24.4 |
| $\Sigma$(fluorides) | 75.6 | 75.6 | 75.6 | 75.6 | 75.6 | 75.6 |
| $\Sigma$(alkaline earth metal fluorides) | 54.6 | 54.6 | 54.6 | 54.6 | 54.6 | 54.6 |
| $P_2O_5$ | 13.8 | 14.3 | 15.2 | 15.0 | 15.1 | 15.6 |
| $Sb_2O_3$ | 2.4 | 2.0 | 1.8 | 1.4 | 1.2 | 1.1 |
| PbO | 3.7 | 3.1 | 2.4 | 2.1 | 1.8 | 1.6 |
| CdO | 2.8 | 2.4 | 1.9 | 1.7 | 1.4 | 1.2 |
| $La_2O_3$ | — | — | — | 1.5 | 1.5 | 1.2 |
| $GeO_2$ | — | 1.2 | 1.2 | 0.9 | 0.8 | 0.7 |
| $TiO_2$ | — | — | 0.9 | 0.8 | 0.7 | 0.6 |
| $Nb_2O_5$ | 1.7 | 1.4 | 1.0 | 1.0 | 0.8 | 0.7 |
| $WO_3$ | — | — | — | — | 1.1 | 1.0 |
| $MoO_3$ | — | — | — | — | — | 0.7 |
| P | 4.5 | 4.9 | 5.3 | 6.5 | 6.6 | 6.9 |
| F | 33.8 | 33.8 | 33.8 | 33.8 | 33.8 | 33.8 |
| F/P | 7.5 | 6.9 | 6.4 | 5.2 | 5.1 | 4.9 |
| $n_e$ | 1.4981 | 1.4998 | 1.5063 | 1.5027 | 1.5042 | 1.5075 |
| $\nu_e$ | 72.3 | 73.0 | 69.6 | 72.0 | 71.4 | 71.7 |
| $\vartheta'_g$ | 0.4867 | 0.4846 | 0.4888 | 0.4872 | 0.4867 | 0.4887 |
| $+\Delta\nu_e$ | 15.8 | 15.0 | 14.6 | 15.6 | 14.8 | 16.6 |

TABLE 7

| Melt No. | 43 | 44 | 45 | 46 | 47 | 48 | 49 |
|---|---|---|---|---|---|---|---|
| $Sb(PO_3)_3$ | 24.4 | 24.4 | 24.4 | 24.4 | 24.4 | 24.4 | 24.4 |
| $MgF_2$ | 5.7 | 5.7 | 5.7 | 5.7 | 5.7 | 5.7 | 5.7 |
| $CaF_2$ | 17.3 | 15.3 | 13.3 | 11.3 | 9.3 | 7.3 | 5.3 |
| $SrF_2$ | 10.2 | 10.2 | 10.2 | 10.2 | 10.2 | 10.2 | 10.2 |
| $BaF_2$ | 21.4 | 23.4 | 25.4 | 27.4 | 29.4 | 31.4 | 33.4 |
| $AlF_3$ | 21.0 | 21.0 | 21.0 | 21.0 | 21.0 | 21.0 | 21.0 |
| $\Sigma Me^x(PO_3)_x$ | 24.4 | 24.4 | 24.4 | 24.4 | 24.4 | 24.4 | 24.4 |
| $\Sigma$(fluorides) | 75.6 | 75.6 | 75.6 | 75.6 | 75.6 | 75.6 | 75.6 |
| $\Sigma$(alkaline earth metal fluorides) | 54.6 | 54.6 | 54.6 | 54.6 | 54.6 | 54.6 | 54.6 |
| $P_2O_5$ | 14.5 | 14.5 | 14.5 | 14.5 | 14.5 | 14.5 | 14.5 |
| $Sb_2O_3$ | 9.9 | 9.9 | 9.9 | 9.9 | 9.9 | 9.9 | 9.9 |
| P | 6.3 | 6.3 | 6.3 | 6.3 | 6.3 | 6.3 | 6.3 |
| F | 33.9 | 33.5 | 32.9 | 32.4 | 31.8 | 31.1 | 30.8 |
| F/P | 5.4 | 5.3 | 5.2 | 5.1 | 5.0 | 5.0 | 4.9 |
| $n_e$ | 1.4896 | 1.4902 | 1.4902 | 1.4953 | 1.4966 | 1.5018 | 1.4993 |
| $\nu_e$ | 80.9 | 80.5 | 80.8 | 80.3 | 80.2 | 80.1 | 79.8 |
| $\vartheta'_g$ | 0.4789 | 0.4779 | 0.4763 | 0.4792 | 0.4753 | 0.4799 | 0.4742 |
| $+\Delta\nu_e$ | 18.9 | 17.8 | 17.0 | 18.5 | 15.8 | 18.8 | 14.5 |

The optical fluorophosphate glasses of Melts No. 43 to 49 thus are characterized by being composed of the following components in about the following amounts, in weight percent:

| Oxide components (a): | |
|---|---|
| Phosphorus pentoxide ($P_2O_5$) | 14.5% |
| Antimony trioxide ($Sb_2O_3$) | 9.9% |
| Fluoride components (b): | |
| Magnesium fluoride ($MgF_2$) | 5.7% |
| Strontium fluoride ($SrF_2$) | 10.2% |
| Aluminum fluoride ($AlF_3$) | 21.0% | while calcium fluoride ($CaF_2$) and barium fluoride ($BaF_2$) are present in amounts sufficient to make up 100%.

The preferred optical fluorophosphate glasses of Melts No. 54 to 56 are characterized by being composed of the following components in about the following amounts, in weight percent:

| Oxide components (a): | |
|---|---|
| Phosphorus pentoxide ($P_2O_5$) | 14.5% |
| Antimony trioxide ($Sb_2O_3$) | 9.9% |
| Fluoride components (b): | |
| Magnesium fluoride ($MgF_2$) | 5.7% |
| Aluminum fluoride ($AlF_3$) | 21.0% | while calcium fluoride ($CaF_2$), strontium fluoride ($SrF_2$), barium fluoride ($BaF_2$), and cadmium fluoride ($CdF_2$) are present in amounts sufficient to make up 100%.

TABLE 9

| Melt No. | 57 | 58 | 59 | 60 | 61 |
|---|---|---|---|---|---|
| $Sb(PO_3)_3$ | 24.4 | 24.4 | 24.4 | 24.4 | 24.4 |
| $MgF_2$ | 5.7 | 5.7 | 5.7 | 5.7 | 5.7 |
| $CaF_2$ | 15.3 | 13.3 | 11.3 | 9.3 | 7.3 |
| $SrF_2$ | 8.2 | 8.2 | 8.2 | 8.2 | 8.2 |
| $BaF_2$ | 23.4 | 23.4 | 23.4 | 23.4 | 23.4 |
| $AlF_3$ | 21.0 | 21.0 | 21.0 | 21.0 | 21.0 |
| $BiF_3$ | 2.0 | 4.0 | 6.0 | 8.0 | 10.0 |
| $\Sigma Me^x(PO_3)_x$ | 24.4 | 24.4 | 24.4 | 24.4 | 24.4 |
| $\Sigma$(fluorides) | 75.6 | 75.6 | 75.6 | 75.6 | 75.6 |
| $\Sigma$(alkaline earth metal fluorides) | 52.6 | 50.6 | 48.6 | 46.6 | 44.6 |
| $P_2O_5$ | 14.5 | 14.5 | 14.5 | 14.5 | 14.5 |
| $Sb_2O_3$ | 9.9 | 9.9 | 9.9 | 9.9 | 9.9 |
| P | 6.3 | 6.3 | 6.3 | 6.3 | 6.3 |
| F | 33.3 | 32.8 | 32.2 | 31.6 | 31.1 |
| F/P | 5.3 | 5.2 | 5.1 | 5.0 | 4.9 |
| $n_e$ | 1.4853 | 1.4922 | 1.5000 | 1.5059 | 1.5068 |
| $\nu_e$ | 79.4 | 76.2 | 72.7 | 69.6 | 67.4 |
| $\vartheta'_g$ | 0.4828 | 0.4856 | 0.4868 | 0.4899 | 0.4904 |
| $+\Delta\nu_e$ | 20.1 | 18.9 | 16.2 | 15.3 | 13.5 |

TABLE 8

| Melt No. | 50 | 51 | 52 | 53 | 54 | 55 | 56 |
|---|---|---|---|---|---|---|---|
| $Sb(PO_3)_3$ | 24.4 | 24.4 | 24.4 | 24.4 | 24.4 | 24.4 | 24.4 |
| $MgF_2$ | 5.7 | 5.7 | 5.7 | 5.7 | 5.7 | 5.7 | 5.7 |
| $CaF_2$ | 17.3 | 17.3 | 17.3 | 17.3 | 15.3 | 17.3 | 17.3 |
| $SrF_2$ | 6.2 | 4.2 | 2.2 | — | 8.2 | 8.2 | 8.2 |
| $BaF_2$ | 25.4 | 27.4 | 29.4 | 31.4 | 23.4 | 21.4 | 19.4 |
| $AlF_3$ | 21.0 | 21.0 | 21.0 | 21.2 | 21.0 | 21.0 | 21.0 |
| $CdF_2$ | — | — | — | — | 2.0 | 2.0 | 4.0 |
| $\Sigma Me^x(PO_3)_x$ | 24.4 | 24.4 | 24.4 | 24.4 | 24.4 | 24.4 | 24.4 |
| $\Sigma$(fluorides) | 75.6 | 75.6 | 75.6 | 75.6 | 75.6 | 75.6 | 75.6 |
| $\Sigma$(alkaline earth metal fluorides) | 54.6 | 54.6 | 54.6 | 54.4 | 52.6 | 52.6 | 50.6 |
| $P_2O_5$ | 14.5 | 14.5 | 14.5 | 14.5 | 14.5 | 14.5 | 14.5 |
| $Sb_2O_3$ | 9.9 | 9.9 | 9.9 | 9.9 | 9.9 | 9.9 | 9.9 |
| P | 6.3 | 6.3 | 6.3 | 6.3 | 6.3 | 6.3 | 6.3 |
| F | 33.6 | 33.5 | 33.3 | 33.1 | 33.4 | 33.8 | 33.9 |
| F/P | 5.3 | 5.3 | 5.3 | 5.3 | 5.3 | 5.4 | 5.4 |
| $n_e$ | 1.4812 | 1.4905 | 1.4869 | 1.4865 | 1.4866 | 1.4868 | 1.4952 |
| $\nu_e$ | 82.5 | 80.6 | 81.4 | 81.1 | 80.9 | 80.8 | 80.3 |
| $\vartheta'_g$ | 0.4769 | 0.4763 | 0.4768 | 0.4772 | 0.4776 | 0.4788 | 0.4776 |
| $+\Delta\nu_e$ | 19.1 | 16.9 | 17.9 | 17.9 | 18.0 | 18.7 | 17.4 |

The optical fluorophosphate glasses of Melts No. 57 to 61 thus are characterized by being composed of the following components in about the following amounts, in weight percent:

| Oxide components (a): | |
|---|---|
| Phosphorus pentoxide ($P_2O_5$) | 14.5% |
| Antimony trioxide ($Sb_2O_3$) | 9.9% |
| Fluoride components (b): | |
| Magnesium fluoride ($MgF_2$) | 5.7% |
| Strontium fluoride ($SrF_2$) | 8.2% |
| Barium fluoride ($BaF_2$) | 23.4% |
| Aluminum fluoride ($AlF_3$) | 21.0% | while calcium fluoride ($CaF_2$) and bismuth trifluoride ($BiF_3$) are present in amounts sufficient to make up 100%.

The optical fluorophosphate glasses of Melts No. 62 to 66 thus are characterized by being composed of the following components in about the following amounts, in weight percent:

| Oxide components (a): | |
|---|---|
| Phosphorus pentoxide ($P_2O_5$) | 14.5% |
| Antimony trioxide ($Sb_2O_3$) | 9.9% |
| Fluoride components (b): | |
| Magnesium fluoride ($MgF_2$) | 5.7% |
| Calcium fluoride ($CaF_2$) | 17.3% |
| Strontium fluoride ($SrF_2$) | 8.2% |
| Aluminum fluoride ($AlF_3$) | 21.0% | while barium fluoride ($BaF_2$) and bismuth trifluoride ($BiF_3$) are present in amounts sufficient to make up 100%.

TABLE 11

| Melt No. | 67 | 68 | 69 | 70 | 71 | 72 | 73 |
|---|---|---|---|---|---|---|---|
| $Sb(PO_3)_3$ | 24.4 | 24.4 | 24.4 | 24.4 | 24.4 | 24.4 | 24.4 |
| $MgF_2$ | 5.7 | 5.7 | 5.7 | 5.7 | 5.7 | 5.7 | 5.7 |
| $CaF_2$ | 17.3 | 17.3 | 17.3 | 15.0 | 13.0 | 11.0 | 13.0 |
| $SrF_2$ | 6.2 | 2.2 | — | — | — | — | — |
| $BaF_2$ | 23.4 | 23.4 | 23.4 | 23.4 | 23.4 | 23.4 | 23.4 |
| $AlF_3$ | 21.0 | 21.0 | 21.0 | 21.0 | 21.0 | 21.0 | 21.0 |
| $K_2TiF_6$ | 2.0 | 6.0 | 8.2 | 10.5 | 12.5 | 14.5 | 6.0 |
| $BaTiF_6$ | — | — | — | — | — | — | 6.5 |
| $\Sigma Me^x(PO_3)_x$ | 24.4 | 24.4 | 24.4 | 24.4 | 24.4 | 24.4 | 24.4 |
| $\Sigma$(fluorides) | 75.6 | 75.6 | 75.6 | 75.6 | 75.6 | 75.6 | 75.6 |
| $\Sigma$(alkaline earth metal fluorides) | 52.6 | 48.6 | 46.4 | 44.1 | 42.1 | 40.1 | 48.6 |
| $P_2O_5$ | 14.5 | 14.5 | 14.5 | 14.5 | 14.5 | 14.5 | 14.5 |
| $Sb_2O_3$ | 9.9 | 9.9 | 9.9 | 9.9 | 9.9 | 9.9 | 9.9 |
| P | 6.3 | 6.3 | 6.3 | 6.3 | 6.3 | 6.3 | 6.3 |
| F | 34.3 | 34.8 | 35.2 | 35.2 | 35.1 | 35.2 | 34.5 |
| F/P | 5.4 | 5.5 | 5.6 | 5.6 | 5.6 | 5.6 | 5.5 |
| $n_e$ | 1.4861 | 1.4912 | 1.4927 | 1.4977 | 1.4986 | 1.5050 | 1.5046 |
| $v_e$ | 77.7 | 70.8 | 66.6 | 63.1 | 58.7 | 56.3 | 61.4 |
| $\vartheta'_g$ | 0.4815 | 0.4915 | 0.4962 | 0.5020 | 0.5089 | 0.5127 | 0.5029 |
| $+\Delta v_e$ | 17.5 | 17.5 | 16.8 | 17.3 | 17.8 | 18.1 | 16.3 |

TABLE 10

| Melt No. | 62 | 63 | 64 | 65 | 66 |
|---|---|---|---|---|---|
| $Sb(PO_3)_3$ | 24.4 | 24.4 | 24.4 | 24.4 | 24.4 |
| $MgF_2$ | 5.7 | 5.7 | 5.7 | 5.7 | 5.7 |
| $CaF_2$ | 17.3 | 17.3 | 17.3 | 17.3 | 17.3 |
| $SrF_2$ | 8.2 | 8.2 | 8.2 | 8.2 | 8.2 |
| $BaF_2$ | 21.4 | 19.4 | 17.4 | 15.4 | 13.4 |
| $AlF_3$ | 21.0 | 21.0 | 21.0 | 21.0 | 21.0 |
| $BiF_3$ | 2.0 | 4.0 | 6.0 | 8.0 | 10.0 |
| $\Sigma Me^x(PO_3)_x$ | 24.4 | 24.4 | 24.4 | 24.4 | 24.4 |
| $\Sigma$(fluorides) | 75.6 | 75.6 | 75.6 | 75.6 | 75.6 |
| $\Sigma$(alkaline earth metal fluorides) | 52.6 | 50.6 | 48.6 | 46.6 | 44.6 |
| $P_2O_5$ | 14.5 | 14.5 | 14.5 | 14.5 | 14.5 |
| $Sb_2O_3$ | 9.9 | 9.9 | 9.9 | 9.9 | 9.9 |
| P | 6.3 | 6.3 | 6.3 | 6.3 | 6.3 |
| F | 33.7 | 33.8 | 33.8 | 33.7 | 33.7 |
| F/P | 5.3 | 5.4 | 5.4 | 5.3 | 5.3 |
| $n_e$ | 1.4903 | 1.4911 | 1.4932 | 1.4964 | 1.5008 |
| $v_e$ | 78.0 | 75.7 | 72.6 | 70.3 | 67.6 |
| $\vartheta'_g$ | 0.4816 | 0.4827 | 0.4867 | 0.4880 | 0.4910 |
| $+\Delta v_e$ | 17.8 | 16.4 | 16.1 | 14.7 | 14.2 |

The preferred optical fluorophosphate glasses of Melts No. 67 and 68 are characterized by being composed of the following components in about the following amounts, in weight percent:

| Oxide components (a): | |
|---|---|
| Phosphorus pentoxide ($P_2O_5$) | 14.5% |
| Antimony trioxide ($Sb_2O_3$) | 9.9% |
| Fluoride components (b): | |
| Magnesium fluoride ($MgF_2$) | 5.7% |
| Barium fluoride ($BaF_2$) | 23.4 |
| Aluminum fluoride ($AlF_3$) | 21.0%, | while calcium fluoride ($CaF_2$), strontium fluoride ($SrF_2$), and the potassium titanium hexafluoride ($K_2TiF_6$) are present in amounts sufficient to make up 100%.

TABLE 12

| Melt No. | 14 | 75 | 76 | 77 | 78 | 79 |
|---|---|---|---|---|---|---|
| $Sb(PO_3)_3$ | 8.0 | 8.0 | 8.0 | 8.0 | 8.0 | 8.0 |
| $Pb(PO_3)_3$ | 8.0 | 8.0 | 8.0 | 8.0 | 8.0 | 8.0 |
| $Nb(PO_3)_5$ | 8.4 | 8.4 | 8.4 | 8.4 | 8.4 | 8.4 |
| $MgF_2$ | 5.7 | 5.7 | 5.7 | 5.7 | 5.7 | 5.7 |
| $CaF_2$ | 17.3 | 17.3 | 17.3 | 17.3 | 17.3 | 17.3 |
| $SrF_2$ | 8.2 | 8.2 | 8.2 | 8.2 | 8.2 | 8.2 |
| $BaF_2$ | 23.4 | 18.4 | 13.4 | 8.4 | 3.4 | — |
| $AlF_3$ | 21.0 | 21.0 | 21.0 | 21.0 | 21.0 | 21.0 |
| $BaTiF_6$ | — | 5.0 | 10.0 | 15.0 | 20.0 | 23.4 |
| $\Sigma Me^x(PO_3)_x$ | 24.4 | 24.4 | 24.4 | 24.4 | 24.4 | 24.4 |
| $\Sigma$(fluorides) | 75.6 | 75.6 | 75.6 | 75.6 | 75.6 | 75.6 |
| $\Sigma$(alkaline earth metal fluorides) | 54.6 | 54.6 | 54.6 | 54.6 | 54.6 | 54.6 |
| $P_2O_5$ | 13.9 | 13.9 | 13.9 | 13.9 | 13.9 | 13.9 |
| $Sb_2O_3$ | 3.3 | 3.3 | 3.3 | 3.3 | 3.3 | 3.3 |
| PbO | 4.9 | 4.9 | 4.9 | 4.9 | 4.9 | 4.9 |
| $Nb_2O_5$ | 2.3 | 2.3 | 2.3 | 2.3 | 2.3 | 2.3 |

TABLE 12—continued

| Melt No. | 14 | 75 | 76 | 77 | 78 | 79 |
|---|---|---|---|---|---|---|
| P | 6.2 | 6.2 | 6.2 | 6.2 | 6.2 | 6.2 |
| F | 33.8 | 34.6 | 35.4 | 36.2 | 37.0 | 37.6 |
| F/P | 5.5 | 5.6 | 5.7 | 5.8 | 6.0 | 6.1 |
| $n_e$ | 1.5062 | 1.5088 | 1.5148 | 1.5174 | 1.5288 | 1.5331 |
| $\nu_e$ | 70.4 | 64.6 | 60.3 | 57.2 | 52.6 | 51.9 |
| $\vartheta'_g$ | 0.4891 | 0.4959 | 0.4988 | 0.5047 | 0.5121 | 0.5153 |
| $+\Delta\nu_e$ | 15.6 | 14.6 | 12.3 | 13.4 | 13.9 | 15.5 |

The preferred optical fluorophosphate glasses of Melts No. 75 to 78 are characterized by being composed of the following components in about the following amounts, in weight percent:

| Oxide components (a): | |
|---|---|
| Phosphorus pentoxide ($P_2O_5$) | 13.9% |
| Antimony trioxide ($Sb_2O_3$) | 3.3% |
| Lead monoxide (PbO) | 4.9% |
| Niobium pentoxide ($Nb_2O_5$) | 2.3% |
| Fluoride components (b): | |
| Magnesium fluoride ($MgF_2$) | 5.7% |
| Calcium fluoride ($CaF_2$) | 17.3% |
| Strontium fluoride ($SrF_2$) | 8.2% |
| Aluminum fluoride ($AlF_3$) | 21.0%, | while barium fluoride ($BaF_2$), and the complex barium titanium hexafluoride ($BaTiF_6$) is present in an amount sufficient to make up 100%.

The graph illustrated in FIG. 1 shows part of the known optical position range in an $n_e$-$\nu_e$ diagram, i.e. the index of refraction $n_e$ is plotted on the ordinate and the Abbe number on the abscissa.

All the examples given in the Tables are indicated by an X and are plotted in said system of coordinates. The range covered by the Abbe values $\nu_e$ and the indices of refraction $n_e$ belonging thereto as corresponding to each of the disclosed examples is appropriately circumscribed by a polygon constructed by connecting by straight lines the points $a$ to $f$ indicated by circles with an X therein. The coordinates of these points $a$ to $f$ correspond to the respective $n_e$-$\nu_e$ values of the following examples.

| Point | Melt No. | Table |
|---|---|---|
| a | 40 | 1 |
| b | 5 | 1 |
| c | 48 | 7 |
| d | 79 | 12 |
| e | 78 | 12 |
| f | 71 | 11 |

FIG. 2 shows the position of each individual value listed in the Tables in a system of coordinates $\vartheta'_g$·$\nu_e$ in which the $\vartheta'_g$ values are plotted as ordinate while the Abbe numbers $\nu_e$ are plotted as abscissa. FIG. 2 thus illustrates graphically the third important optical parameter of the fluorophosphate glasses according to the present invention, namely the positive anomalous partial dispersion value $+\Delta\nu_e$.

As is known, the following mathematical relationship applies to the ordinate value $\vartheta'_g$ and the abscissa value $\nu_e$:

$$\vartheta'_g = \frac{n_g - n_{F'}}{n_{F'} - n_{C'}}; \qquad \nu_e = \frac{n_e - 1}{n_{F'} - n_{C'}}$$

The subscript indices e, g, C', and F' of the equations given hereinabove indicate spectral wave lengths or spectral lines, namely e = green mercury line of the wave length of 546.07 nm.

g = blue mercury line of the wave length of 435.84 nm.

F' = blue cadmium line of the wave length of 479.99 nm.

C' = red cadmium line of the wave length of 643.85 nm.

It is evident that all the glasses according to the present invention as plotted in FIG. 2 are positioned far to the right of the so-called "standard straight line". All of them thus have a relatively large positive anomalous dispersion value $+\Delta\nu_e$, i.e. they are ($+\Delta\nu_e$) glasses of a higher $\nu_e$ value than a "standard glass" positioned on the standard straight line. For instance, the deviation from the standard straight line of the point $r$ selected at random (Example 9 of Table 2) amounts to the following value:

$$\Delta\nu_e = 72.2 - 59.8 = +12.4.$$

The examples plotted in FIG. 2 are circumscribed by a polygon, the points $g$ to $p$ of which are to be associated with the following examples:

| Point | Melt No. | Table |
|---|---|---|
| g | 40 | 1 |
| h | 3 | 1 |
| i | 6 | 1 |
| l | 78 | 12 |
| m | 79 | 12 |
| n | 72 | 11 |
| o | 4 | 1 |
| p | 5 | 1 |

Table 1 illustrates glasses in which antimony trimetaphosphate ($Sb(PO_3)_3$) together with fluorides are used as the sole glass-forming agents. The six or, respectively, seven components of such glasses are given in the first horizontal column in the weight percent amounts in which they are added to the melt mixture.

The second group of horizontal columns shows first the sum of the metaphosphates indicated as follows: $\Sigma Me^x(PO_3)_x$, whereby $x$ represents the cation valencies between 2 and 6. Thereafter the sum of all fluorides including those of potassium hydrogen fluoride ($KHF_2$) and of the complex fluorides ($K_2TiF_6$, $BaTiF_6$) and finally the sum of the alkaline earth metal fluorides are given.

In the third group of horizontal columns there are listed the metaphosphates and/or, respectively, lanthanum orthophosphate ($LaPO_4$) (compare Table 4) indicated in the form of their oxidic components, i.e. calculated as the stable oxide of the respective cation and as phosphorus pentoxide ($P_2O_5$).

The next group of horizontal columns shows first the calculated phosphorus amount (P), thereafter the fluroine content (F), and finally the quotient fluorine to phosphorus (F/P).